US012687929B2

(12) United States Patent
Ramirez-Aristizabal et al.

(10) Patent No.: US 12,687,929 B2
(45) Date of Patent: Jul. 21, 2026

(54) ADAPTIVE PROMPT CUSTOMIZATION USING BRAINWAVE ACTIVITY DATA

(71) Applicant: Accenture Global Solutions Limited, Dublin (IE)

(72) Inventors: Adolfo Ramirez-Aristizabal, San Francisco, CA (US); Alexandria Emily Pabst, Riverbank, CA (US); Jordan Alexander Ackerman, San Francisco, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 72 days.

(21) Appl. No.: 18/754,077

(22) Filed: Jun. 25, 2024

(65) Prior Publication Data

US 2025/0004557 A1     Jan. 2, 2025

Related U.S. Application Data

(60) Provisional application No. 63/510,423, filed on Jun. 27, 2023.

(51) Int. Cl.
 *G06F 3/01* (2006.01)
 *G06T 11/00* (2026.01)
(52) U.S. Cl.
 CPC .............. *G06F 3/015* (2013.01); *G06T 11/00* (2013.01)
(58) Field of Classification Search
 CPC ................................ G06F 3/015; G06T 11/00
 USPC .......................................................... 345/156
 See application file for complete search history.

(56) References Cited

U.S. PATENT DOCUMENTS

| | | | | |
|---|---|---|---|---|
| 11,291,394 | B2 * | 4/2022 | Lee ........................ | A61B 5/1118 |
| 2014/0347265 | A1 * | 11/2014 | Aimone .................. | G06F 3/015 |
| | | | | 345/156 |
| 2019/0113973 | A1 * | 4/2019 | Coleman ................. | G06F 3/015 |
| 2019/0387998 | A1 * | 12/2019 | Garten ..................... | A61B 5/38 |

(Continued)

OTHER PUBLICATIONS

Matteo Ferrante et al: "Semantic Brain Decoding: from fMRI to conceptually similar image reconstruction of visual stimuli", arxiv. org, Cornell University Library, 201 Olin Library Cornell University Ithaca, NY 14853, Mar. 22, 2023, pp. 1-31.

(Continued)

*Primary Examiner* — Calvin C Ma
(74) *Attorney, Agent, or Firm* — Mannava & Kang, P.C.

(57)     ABSTRACT

A system for generating highly personalized image content with generative artificial intelligence (AI) that incorporates brainwave data collected from a Brain-Computer Interface (BCI) device worn by the user while they are immersed in their experiences. The system can identify a mood (i.e., cognitive, mental, and emotional states) felt by the user during that time. The system develops a prompt that describes the target scene and modulates the weights assigned to each parameter in the prompt based on the mood identified. The generative AI engine can then to apply the mood to the target scene by adjusting image attributes such as hue, saturation, and lighting. The outputted image can offer a visual representation not only of the objects that were in the user's environment, but also the user's general perception and experience of the occasion. The process is passive and requires no interaction from the user to define their emotional affect.

20 Claims, 13 Drawing Sheets

(56) References Cited

U.S. PATENT DOCUMENTS

2022/0224963 A1* 7/2022 Herz ................. G06Q 30/0269

OTHER PUBLICATIONS

Garg Anumit et al: "Merged LSTM Model for emotion classification using EEG signals", 2019 International Conference on Data Science and Engineering (ICDSE), IEEE, Sep. 26, 2019 (Sep. 26, 2019), pp. 139-143.

Matteo Ferrante et al: "Brain Captioning: Decoding human brain activity into images and text", arxiv.org, Cornell University Library, 201 Olin Library Cornell University Ithaca, NY 14853, May 19, 2023.

Yulong Liu et al: "BrainCLIP: Bridging Brain and Visual-Linguistic Representation via CLIP for Generic Natural Visual Stimulus Decoding from fMRI", arxiv.org, Cornell University Library, 201 Olin Library Cornell University Ithaca, NY 14853, Feb. 25, 2023, pp. 1-10.

Yu Takagi et al: "Improving visual image reconstruction from human brain activity using latent diffusion models via multiple decoded inputs", arxiv.org, Cornell University Library, 201 Olin Library Cornell University Ithaca, NY 14853, Jun. 20, 2023, pp. 1-7.

* cited by examiner

Figure 1:
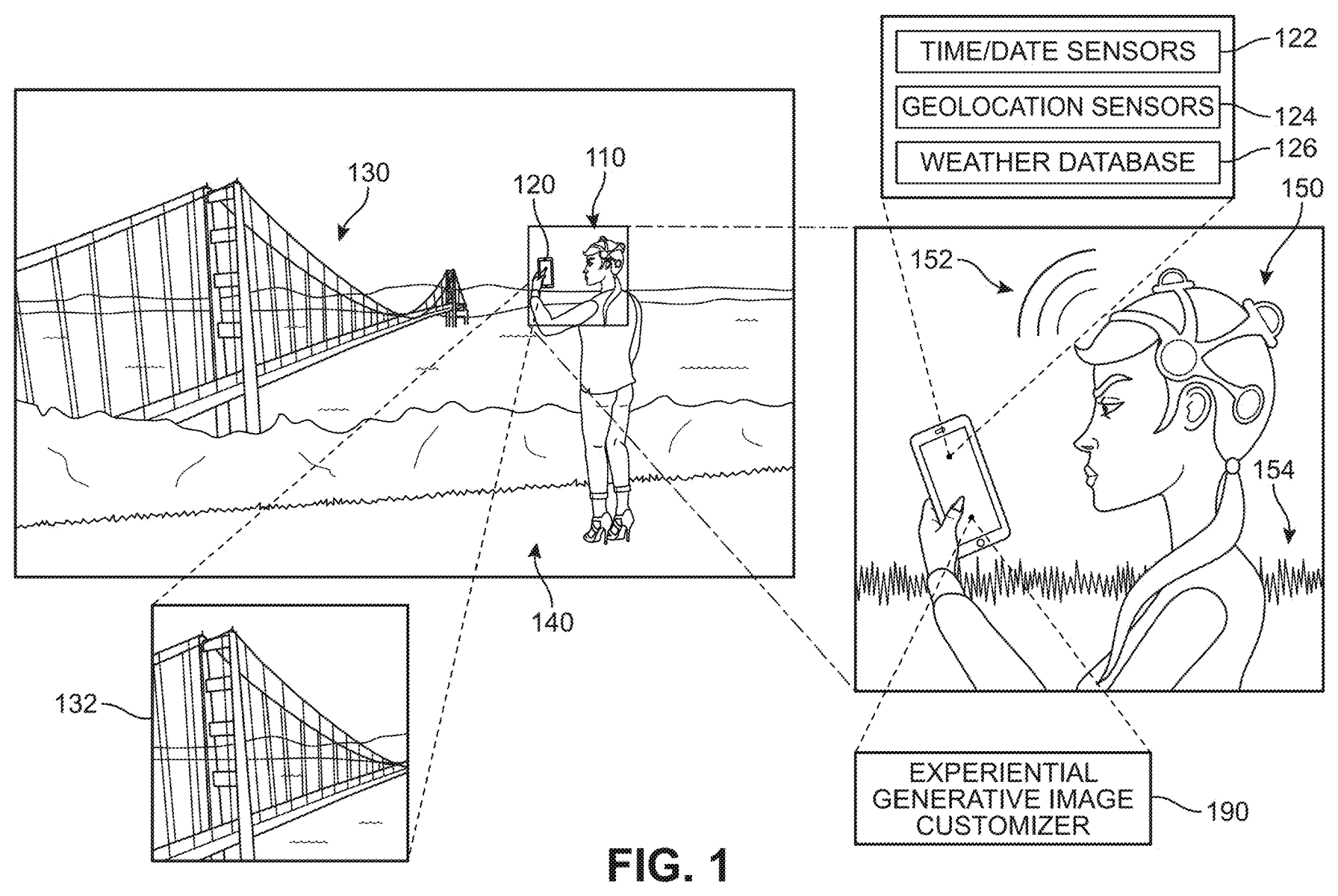

TIME/DATE SENSORS 122
GEOLOCATION SENSORS 124
WEATHER DATABASE 126

150
154
152

EXPERIENTIAL GENERATIVE IMAGE CUSTOMIZER 190

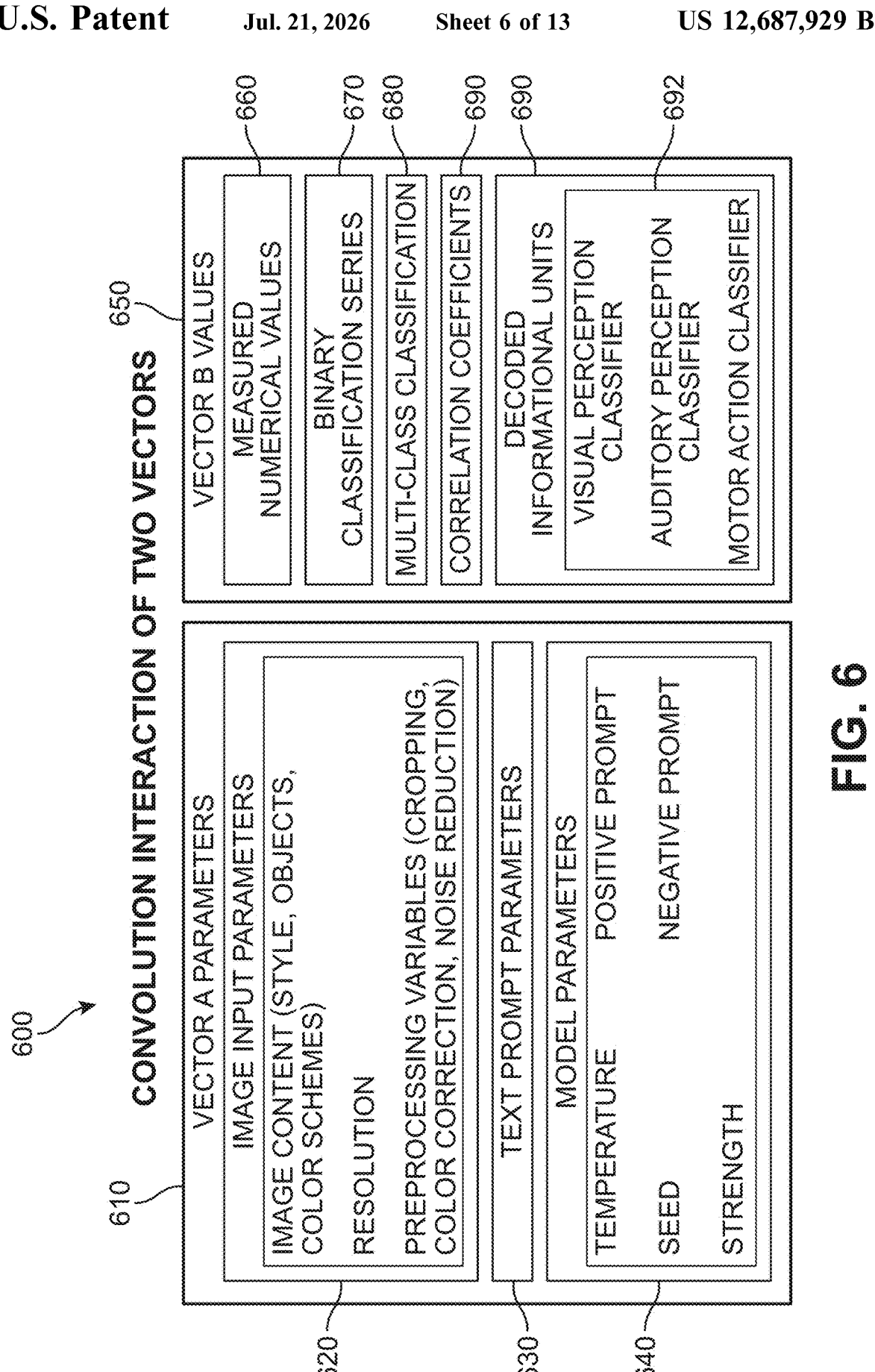

CONVOLUTION INTERACTION OF TWO VECTORS

600

650

610

VECTOR A PARAMETERS

IMAGE INPUT PARAMETERS

620

IMAGE CONTENT (STYLE, OBJECTS, COLOR SCHEMES)

RESOLUTION

PREPROCESSING VARIABLES (CROPPING, COLOR CORRECTION, NOISE REDUCTION)

TEXT PROMPT PARAMETERS

630

MODEL PARAMETERS

POSITIVE PROMPT

NEGATIVE PROMPT

TEMPERATURE

640

SEED

STRENGTH

VECTOR B VALUES

660

MEASURED NUMERICAL VALUES

670

BINARY CLASSIFICATION SERIES

680

MULTI-CLASS CLASSIFICATION

690

CORRELATION COEFFICIENTS

690

DECODED INFORMATIONAL UNITS

VISUAL PERCEPTION CLASSIFIER

AUDITORY PERCEPTION CLASSIFIER

692

MOTOR ACTION CLASSIFIER

FIG. 6

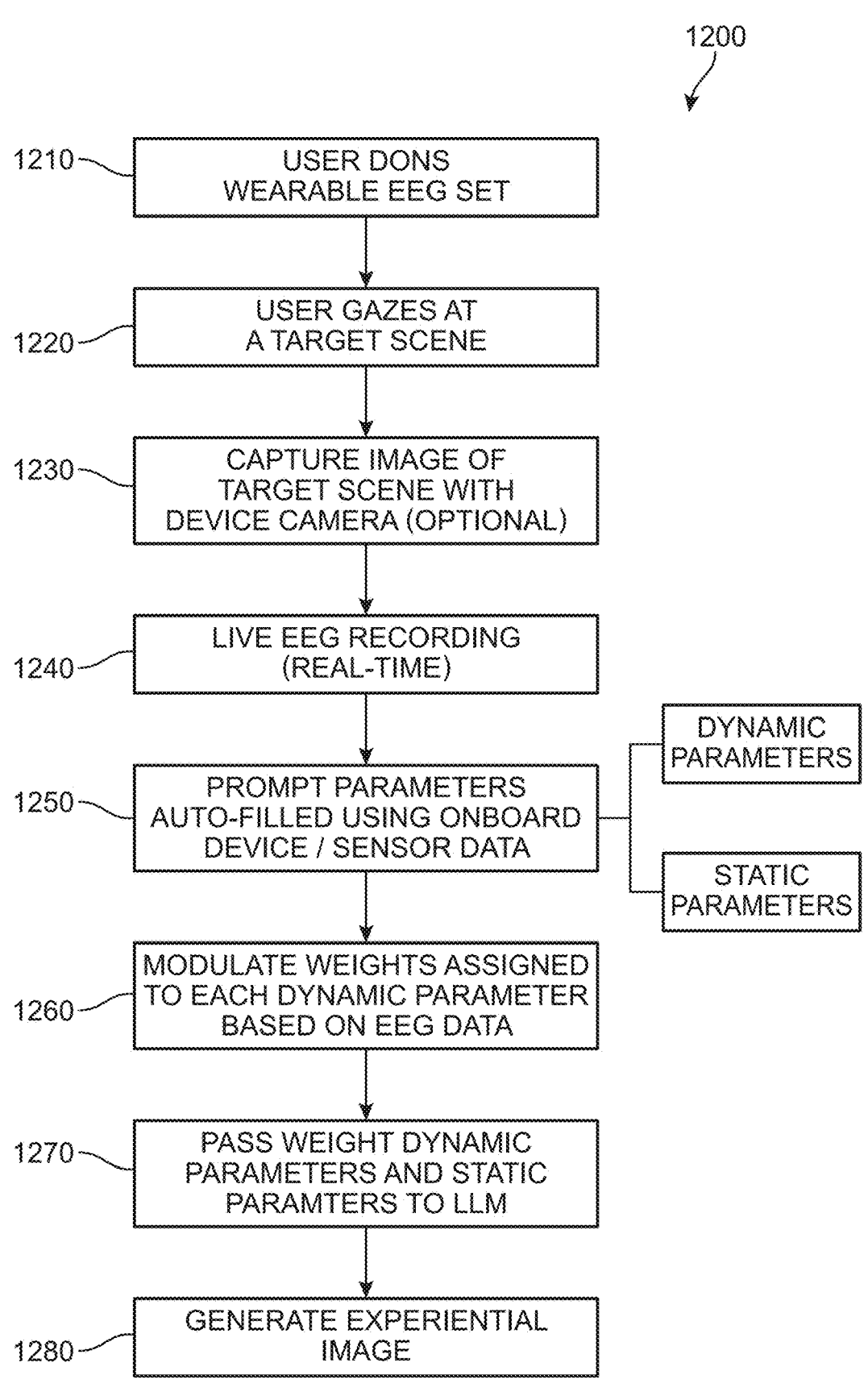

1200

1210 — USER DONS WEARABLE EEG SET

1220 — USER GAZES AT A TARGET SCENE

1230 — CAPTURE IMAGE OF TARGET SCENE WITH DEVICE CAMERA (OPTIONAL)

1240 — LIVE EEG RECORDING (REAL-TIME)

1250 — PROMPT PARAMETERS AUTO-FILLED USING ONBOARD DEVICE / SENSOR DATA

DYNAMIC PARAMETERS

STATIC PARAMETERS

1260 — MODULATE WEIGHTS ASSIGNED TO EACH DYNAMIC PARAMETER BASED ON EEG DATA

1270 — PASS WEIGHT DYNAMIC PARAMETERS AND STATIC PARAMTERS TO LLM

1280 — GENERATE EXPERIENTIAL IMAGE

FIG. 12

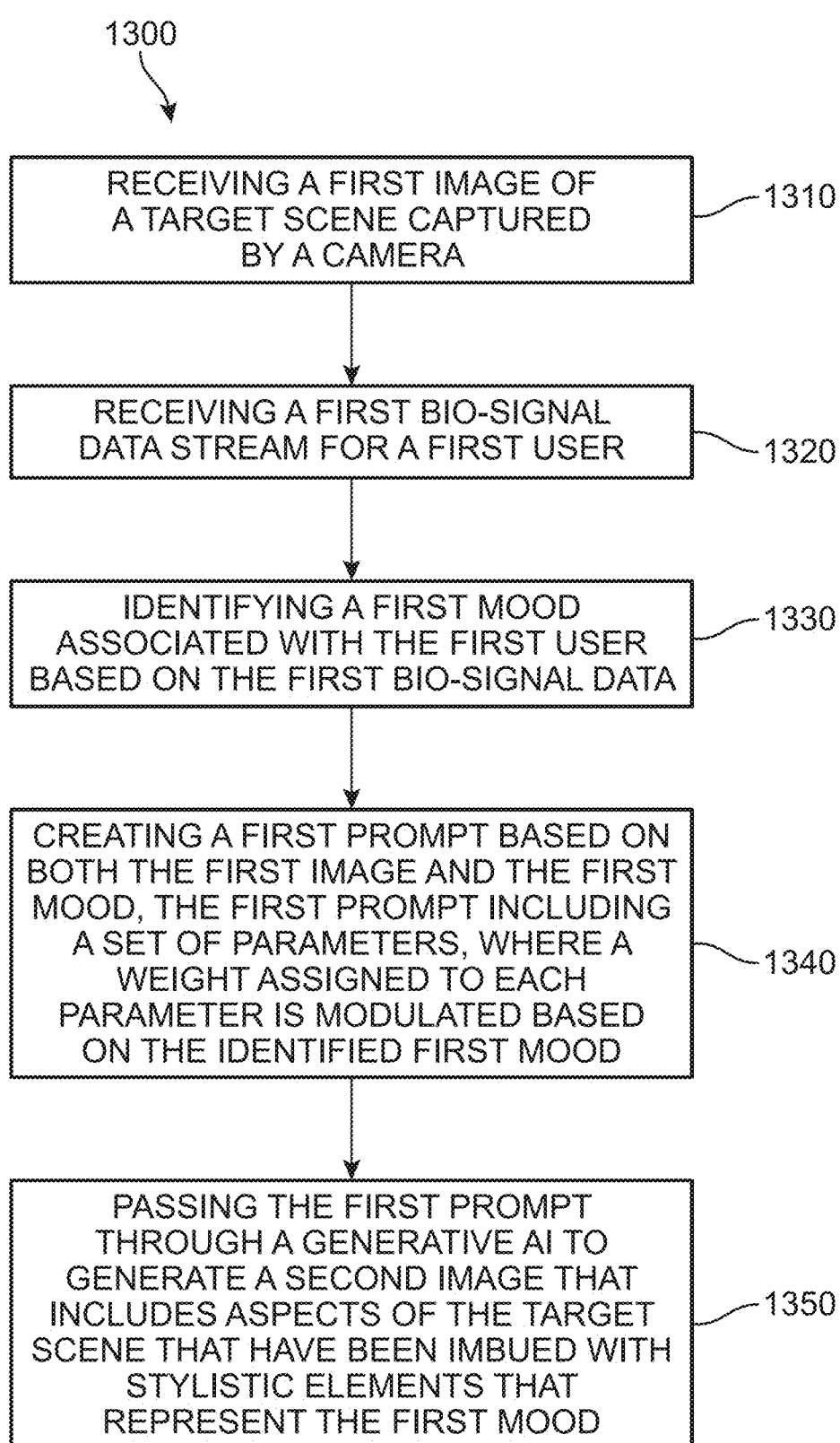

1300

RECEIVING A FIRST IMAGE OF
A TARGET SCENE CAPTURED
BY A CAMERA — 1310

RECEIVING A FIRST BIO-SIGNAL
DATA STREAM FOR A FIRST USER — 1320

IDENTIFYING A FIRST MOOD
ASSOCIATED WITH THE FIRST USER
BASED ON THE FIRST BIO-SIGNAL DATA — 1330

CREATING A FIRST PROMPT BASED ON
BOTH THE FIRST IMAGE AND THE FIRST
MOOD, THE FIRST PROMPT INCLUDING
A SET OF PARAMETERS, WHERE A
WEIGHT ASSIGNED TO EACH
PARAMETER IS MODULATED BASED
ON THE IDENTIFIED FIRST MOOD — 1340

PASSING THE FIRST PROMPT
THROUGH A GENERATIVE AI TO
GENERATE A SECOND IMAGE THAT
INCLUDES ASPECTS OF THE TARGET
SCENE THAT HAVE BEEN IMBUED WITH
STYLISTIC ELEMENTS THAT
REPRESENT THE FIRST MOOD — 1350

FIG. 13

ADAPTIVE PROMPT CUSTOMIZATION USING BRAINWAVE ACTIVITY DATA

CROSS-REFERENCE TO RELATED APPLICATION

This application claims the benefit of U.S. Provisional Patent Application Ser. No. 63/510,423 filed on Jun. 27, 2023 and titled "Adaptive Prompt Customization Using Brainwave Activity Data", the disclosure of which is incorporated by reference herein in its entirety.

TECHNICAL FIELD

The present disclosure generally relates to a method and system for passive generation of personalized content. More specifically, the present disclosure relates to a system and method for customization of prompts for use with Generative Artificial Intelligence (AI) to generate content that is modulated based on the user's brainwave activity.

BACKGROUND

Humankind is entering a novel era of creativity—an era in which any person can quickly synthesize digital content. One paradigm through which this revolution is taking place employs prompt-based learning (or "in-context" learning). This technique has found fruitful application in text-to-image generation, where it is being used to synthesize digital images from zero-shot text prompts inputted in natural language for the purpose of creating artificial intelligence (AI) art. The practice of iteratively crafting prompts to generate and improve images is referred to as prompt engineering.

Although such prompts are text-based and can be used to generate artworks or other visual products, user-authored prompts are often missing the specific vocabulary needed to apply a certain style to the generated images that would confer a greater degree of personalization. For many users, this process is hindered because effective prompt engineering requires expertise and practice. In other words, to create meaningful outputs, the user is required to engage and interact actively in the prompt process. A person who is experiencing or otherwise immersed in a particular moment but also wishes to capture the inner experience of that moment must by necessity step out of the moment to search for the appropriate descriptive terms to provide to the generative AI. Thus, the development of tools for users to discover and express relationships between their internal experiences that are not readily apparent to others—or even to users themselves—and the real-world is highly desirable.

There is a need in the art for a system and method that addresses the shortcomings discussed above.

SUMMARY

The proposed systems and methods describe a passive and dynamic approach to image generation. The system incorporates a livestream of brainwave data such as EEG that can be used to predict a user's mood (i.e., cognitive, mental, and emotional states) during a given experience. The user continues their normal activity and remains immersed in their real-world experience as the brainwave data is obtained. The system can convert this stream into a representation of the user's contextual awareness of the events occurring around them. Thus, the proposed systems offer a new modality by which a mask array of a parameters can be dynamically updated based on this neurological data. While conventional generative workflows such as Text-to-Image, Image-to-Image, Text-to-Video, Text-to-Audio, and similar techniques rely on parameters that are associated with static weights, the systems described herein provide a technical process by which the weights assigned to each parameter in a prompt can be modulated based on the user's mood. These modulated weights, when received by a generative AI engine, can be applied to a particular target scene and cause the generated image to be rendered with highly personalized and nuanced stylistic elements and filters that convey the user's mood at the time they were a witness of the target scene. The system allows users to remain immersed in their experiences while crafting a bespoke image that not only depicts their view of the environment, but their inner perception of the view as well.

In one aspect, the disclosure provides a method of generating personalized image content. The method includes a step of receiving, at a computing device, a first image of a target scene captured by a camera at a first time. A second step includes receiving, at the computing device, a first bio-signal data stream for a first user collected at or around the first time. A third step includes identifying, at the computing device, a first mood associated with the first user based on the first bio-signal data. In addition, a fourth step includes creating a first prompt based on both the first image and the first mood, the first prompt including a set of parameters, wherein a weight assigned to each parameter is modulated based on the identified first mood. A fifth step includes passing or applying the first prompt through a generative artificial intelligence (AI) to generate a second image that includes aspects of the target scene that have been imbued with stylistic elements that represent the first mood.

In another aspect, the disclosure provides a non-transitory computer-readable medium storing software comprising instructions executable by one or more computers which, upon such execution, cause the one or more computers to generate personalized image content by performing the following: (1) receiving, at a computing device, a first image of a target scene captured by a camera at a first time; (2) receiving, at the computing device, a first bio-signal data stream for a first user collected at or around the first time; (3) identifying, at the computing device, a first mood associated with the first user based on the first bio-signal data; (4) creating a first prompt based on both the first image and the first mood, the first prompt including a set of parameters, wherein a weight assigned to each parameter is modulated based on the identified first mood; and (5) passing the first prompt through a generative artificial intelligence (AI) to generate a second image that includes aspects of the target scene that have been imbued with stylistic elements that represent the first mood.

In yet another aspect, the disclosure provides a system for extracting object information from digital images, the system comprising one or more computers and one or more storage devices storing instructions that may be operable, when executed by the one or more computers, to cause the one or more computers to: (1) receive, at a computing device, a first image of a target scene captured by a camera at a first time; (2) receive, at the computing device, a first bio-signal data stream for a first user collected at or around the first time; (3) identify, at the computing device, a first mood associated with the first user based on the first bio-signal data; (4) create a first prompt based on both the first image and the first mood, the first prompt including a set of parameters, wherein a weight assigned to each parameter is modulated based on the identified first mood; and (5) pass the first prompt through a generative artificial intelligence (AI) to generate a second image that includes aspects of the target scene that have been imbued with stylistic elements that represent the first mood.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is a depiction of a user capturing an image of a target scene with their camera while their brainwave activity is recorded, according to an embodiment;

FIGS. 6 and 7 present some examples of vector parameters and their convolutional interaction for purposes of modulating the prompt, according to an embodiment;

FIG. 12 is a flow diagram of an example scenario by which the proposed experiential prompt customization image generation system can be implemented, according to an embodiment; and FIG. 13 is a flow chart presenting a method of generating personalized image content, according to an embodiment.

DESCRIPTION OF EMBODIMENTS

Figure 2:
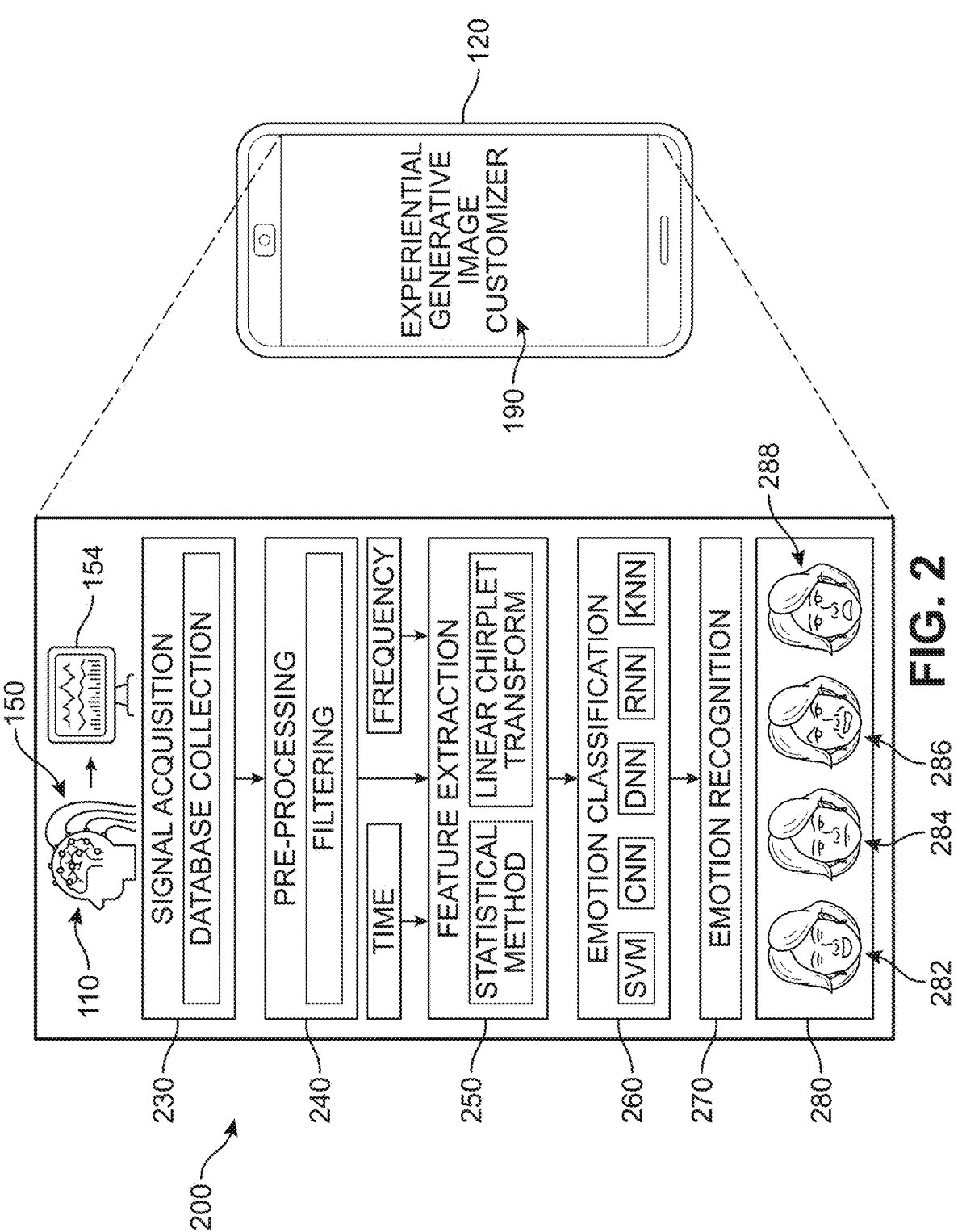
FIG. 2 is a flow diagram showing a process by which brainwave data can be used to identify a user's mood, according to an embodiment.

Described herein are systems, methods, devices, and other techniques for custom-modulation of generative artificial intelligence (AI) prompt parameters to facilitate immersive content generation. The proposed embodiments incorporate a user's mood (i.e., cognitive, mental, and emotional states) into generative content by the collection of user brainwave activity. For example, the system can incorporate brainwave activity as manifested in electroencephalogram (EEG) data collected from the user during their real-world experiences. In other words, in different embodiments, biological signals of a user can be 'livestreamed' to a wearable device and then used in real-time or near-real-time to passively modulate the influence (e.g., weights) that a particular descriptive text-based parameter or feature will have on the generated content. The user's mood can be incorporated into the generated content. For example, if a user is sad, the generated content can incorporate sadness. In another example, if a user is cognitively engaged, the generated content can incorporate engagement.

For purposes of this application, a person's "brain state" refers to patterns of correlation between brain waves, or an objectively discernable and quantifiable pattern of power density, neuronal firing, correlations between brain waves, and/or other dynamic physical characteristics of the brain. As used in this application, brain states can be statistically defined and reflect a relationship with a "cognitive state" or "mental state" (or affective state) label. These states (cognitive, mental, emotional) can be collectively referred to as a person's mood. Cognitive states can include, for example, cognitive load, engagement, fatigue, excitement, relaxation, etc. Emotional states can include happy, sad, stressed/worried, relaxed, disgust, appetizing, enthused, afraid, calm, angry, frustrated, peaceful, etc. Brain states can be observed during conscious, subconscious and/or sleep stages. For example, a "brain state" or mood may be characterized by the functional coordination of the connectivity and coherent phase-amplitude coupling between a brain's delta, theta, alpha, gamma, and beta frequency waves.

In different embodiments, the proposed systems allow users to capture their mental states and use the EEG data to automatically customize prompts without interrupting their immersion in a given experience of the physical world. In other words, the system enables the users to focus their attention on their experience without diverting attention to communication and content creation. In one example, the system allows the user to remain 'in-the-moment' and focused in living their experience while the natural flow of their produced bio-signals are collected and used to help define the specifics of the prompt that is then shared with a generative artificial intelligence (AI). As one example, the system implements this transformative, personalized output by a combination of Brain-Computer Interface (BCI) technology with Generative AI.

Thus, in contrast to conventional generative AI prompt engineering paradigms, the proposed embodiments can provide users with a tool by which they can passively include aspects of their mental states into a generative workflow. This highly personalized data can then be transformed to produce content that takes into account their private inner experience. This approach offers an alternative to "active" input methods such as writing of text prompts, asking questions and/or answering them via a conversational interface, and/or manually editing the generative workflows. By reducing the user's active involvement in the content creation, users are able to stay immersed in their experience of a product, task, environment and etc. This process can be implemented via a algorithmic capability is meant to be embedded in hardware devices that can enable Augmented Reality/Mixed Reality applications to capture streams of bio/neuro-sensing from the user.

For purposes of illustration, an example scenario in which an embodiment of the proposed systems can be implemented is provided in FIGS. 1-5. In FIG. 1, a scenario is presented in which a user 110 is depicted on-site at a first location 140 (e.g., San Francisco), in this case visiting a landmark 130 (e.g., the Golden Gate bridge) as part of their excursion. The user 110 is also taking photographs via their mobile computing device ("device") 120 (e.g., smartphone, smart camera, phablet, etc.) during their visit. In different embodiments, this device 120 can enable interfacing with an augmented reality (AR)/mixed reality (MR) application ("AR/MR app"), and/or also support the inclusion of connections with and data transfers from bio-sensing tools such as EEG headset 150.

As depicted in FIG. 1, the user 110 is wearing the EEG headset 150 as she views the landmark 130 and captures the desired photographs. capabilities. As she lives in her experience of viewing landmark 130, the user 110 wishes to record and/or manifest this experience without interrupting her sensations or perceptions to actively provide some descriptions of her feelings, which can remove her from the experience. In this example, the user 110 has installed an experiential generative AI image customizer application ("experiential image app") 190. Thus, by running the experiential image app 190 on device 120 that employs an Image-to-Image generative workflow "under the hood", the user 110 is able to continue their lived experience while their device 120 automatically and passively performs a process by which a generative image that is customized per the user's own brain activity (as measured while they were "in" their experience) is produced.

In FIG. 1, the user 110 captures a photograph 132 with the device 120. At or around the same time, as the device 120 is running the experiential image app 190, brainwave data 154 is also measured at EEG headset 150 and transmitted 152 to device 120. The brainwave data 154 is received by the experiential image app 190, which integrates this incoming stream of bio-sensing (e.g., see FIG. 2). In addition, in different embodiments, also at or around the same time, as the device 120 is running the experiential image app 190, context data including but not limited to information provided via time/date sensors 122, geolocation sensors 124, and weather databases 126 can be obtained and shared with the experiential image app 190. In different embodiments, device 120 can include various sensors such as sensors for measuring orientation, altitude, and/or acceleration, as well as location sensors to determine a GPS location of the device 120. For example, sensors can include a gyroscope, an altimeter, and an accelerometer. Camera may comprise any kind of camera, including any kind of digital camera, as well as a camera configured to capture infrared, x-ray, ultraviolet, and visible light signals.

Thus, it can be appreciated that the user captures an image of a portion of her environment that includes a "Target Scene" reflecting the visual focal point that the user is perceiving and experiencing (in this example, the Golden Gate bridge). Furthermore, in some embodiments, based on context data, details associated with the target scene can be harvested, including identification of the person, place, or thing that was the focus of their attention as they gazed at the target scene. In addition, as the user contemplates her selected target scene, she wears a brain-sensing neuro-headset, or some other hardware that can be used to measure their brain signals (e.g., electroencephalogram, electromyography, magnetoencephalogram, functional near infrared spectroscopy, etc.). In some embodiments, the hardware captures a live stream of the user's neural signals, which can be transmitted for example by wire from the headset or wirelessly over a Bluetooth connection.

Referring now to FIG. 2, a schematic diagram shows an example biosignal processing flow 200 by which the experiential image app 190 can recognize/predict and classify a user's emotional experience from the collected brainwave data 154. As noted earlier, in different embodiments, the brainwave data 154 is obtained via a BCI worn by the user at the time of their experience. Although FIG. 2 depicts these tasks as being performed by the device 120, it should be understood that in other embodiments, some or all of the tasks described in FIG. 2 can also or alternatively be performed by the EEG headset 150 and the output communicated to the experiential image app 190 on device 120.

As a general matter, BCIs are systems that enable any user to exchange information with the environment and control devices by using brain activity, i.e., without using the neuromuscular output pathways of the brain. Thus, these are passive outputs of the human body. Brain signals can be acquired by means of invasive or non-invasive methods. In the former, electrodes are implanted directly in the brain. In the latter, the signal is acquired from the scalp of the user. One of the most attractive methods by which to acquire brain signals involves the electroencephalogram (EEG) because it is non-invasive, portable, inexpensive, and can be used in almost all environments. Moreover, low cost and increasingly portable EEG equipment have been developed in the last years The electroencephalogram (EEG) is one of the oldest non-invasive investigative tools of brain neurophysiology. It measures summed electrical currents generated by neural activity from multiple scalp electrode sites. The EEG measures changes in activity on a temporal scale unmatched by more modern imaging techniques, often in the range of only a few seconds. As general background for the reader, it can be understood that the electrical activity of a neuronal network represents a high level of integration which is situated in between the biochemical molecular basis of communication and behavior.

Brain patterns form wave shapes that are commonly sinusoidal. Usually, they are measured from peak to peak and normally range from 0.5 to 100 μV in amplitude. In one example, a power spectrum from the raw EEG signal can be derived. In the power spectrum, the contribution of sine waves with different frequencies are visible. Although the spectrum is continuous, ranging from 0 Hz up to one half of sampling frequency, the brain state of the individual may make certain frequencies more dominant, a factor that is used by the machine learning model to determine a person's most likely brain state.

Different frequency components are categorized into delta (less than 4 Hz), theta (4-8 Hz), alpha (8-12 Hz), beta (12-40 Hz), and gamma (40-100 Hz) where each represents a particular physiological function. However, it should be understood that while these ranges are known in the field of neuroscience, the actual EEG signal carrying the component signals can be processed in a way so as to take into account of normal uncertainty that may accompany the raw data (e.g., variability in sensor device equipment, individual human scalp noise, etc.). For purposes of this application, the model can be configured to isolate each of the five bandwidths with a range variation of 5%, and in some cases, up to 10-15%, as per standard neurological research practices.

As a very high-level summary, delta waves are typically observed in the EEG signal when a person is asleep, theta waves when a person is sleepy, alpha waves when a person is relaxed and his/her muscles are loose but he/she is awake, beta waves when a person is alert, and gamma waves are observed when a person is trying to solve a problem. Alpha activity is typically induced by closing the eyes and by relaxation, and abolished by eye opening or alerting by any mechanism (thinking, calculating). Most humans are sensitive to the phenomenon of "eye closing", i.e., when they close their eyes their wave pattern significantly changes from beta into alpha waves. EEG is thus sensitive to a continuum of brain states ranging from stress state, alertness to resting state, hypnosis, and sleep. During normal state of wakefulness with open eyes beta waves are dominant. In relaxation or drowsiness the power of alpha activity rises and if sleep appears, the power of lower frequency bands increase.

There is evidence that animals and humans sense the environment in snapshots, rather than continuously, with the brain rhythms of enhanced sensitivity to sensory input cycling at specific frequencies. The proposed systems leverage the growing availability of portable EEG collection devices to extend the user's brain state snapshot into compelling, experiential imagery. In general, devices for brain data collection such as EEG can employ any available EEG-recording device such as but not limited to headsets with EEG sensors that are typically located inside a headband or cap to be worn on the head. Many vendors produce consumer-grade EEG headbands, including EEG caps, headbands, or headsets produced by NeuroSky Inc.®, Emotiv Inc.®, MacroTellect®, Myndplay®, Neeuro®, Focus-Calm®, or Interaxon Inc.® (e.g., providers of the Muse® headset), or other consumer-grade EEG recording devices.

Thus, the electrodes of an EEG device can capture electrical activity expressed in various EEG frequencies. The processing flow 200 includes four main tasks. First is signal acquisition 230, where the EEG headset 150 worn by user 110 records a high-quality signal (brainwave data 154) from the brain. These raw signals are often contaminated with unwanted noise and artifacts. Therefore, a second task involves preprocessing 240 of the raw signal to remove or minimize these noise and artifacts, which uses different filters, and then the raw signal is down-sampled to some sampling frequency. After the signal is preprocessed, feature extraction 250 can be carried out. In this stage, various entropy methods can be used to extract significant information from the EEG data. For example, after obtaining the noise-free signals from the signal enhancing pre-processing phase, essential features from the brain signals can be extracted. Feature extraction aims at describing the signals by a few relevant values called "features". With the help of feature extraction, the original EEG data is represented by a reduced number of highly significant variables so as to find a difference in the different brain states during different tasks. Various temporal (time) and spatial (frequency) approaches can be applied to extract features from the physiological signal. In some embodiments, there may be 24 or more features extracted from the EEG signal using a statistical modeling technique. In other cases, a linear chirplet transform can be performed on the signal before extracting the frequency domain feature. In some embodiments, other feature extraction techniques known by those skilled in the art can be used.

Finally, an emotion classification task 260 can be performed. After selecting the features useful to the psychological state, classifiers that are trained in such a way that different emotional states can be categorized using the extracted features are fed the feature data. These emotion classification models are designed with the intent to recognize specific emotions employing proposed attributes. In different embodiments, classifiers such as K-Nearest Neighbor (KNN), Support Vector Machines (SVM), integration of deep belief network and SVM (DBN-SVM), channel frequency convolutional neural network (CFCNN), multilayer perception, time-delay neural network, probabilistic neural network (PNN), least-square SVM, etc., can be employed by the system for emotion recognition. In one example, custom neural decoding models that process the brain signals so that they can be better interpreted (e.g., denoising models, decomposition models, classification models, regression models, etc.) can be applied to the brain data. From these classifier(s), the system can output an emotion recognition determination 270 in which one or more emotional states 280 can be identified as having been felt by the user 110 during their experience (e.g., emotion label output). As some non-limiting examples, the output can describe the user 110 as having felt one of a happy state 282, sad state 284, angry state 286, and afraid state 288. A wide range of other emotional states can be recognized in real-time or near-real-time by the emotion recognition classifier, including disgust, frustration, weariness, sleepiness, amusement, surprise, etc. for incorporation into the generative AI customization process, as described below.

However, in different embodiments, the numerical values tracked by the parameters discussed above do not necessarily need to depend on specific neural decoding models but can simply come from the raw voltage values on the signal. For example, the live stream of raw voltage can be captured as numerical array containers which reflect the raw state of oscillation that can be used to interact with the prompt values. In another example, a simple heuristic can be used as a function that defines the numerical values of the parameters, like looking at the ratio of positive and negative values given some time window, where the parameter would hold a certain ratio of positive values as its numerical value like [0.25, POSITIVE]. In some embodiments, the brain data can be converted into a scalar representation of binary emotional states, such as "1" being happiest and "10" being saddest (and etc.). Furthermore, the livestream of brain signals can follow standard pre-processing to normalize the data to a range of values, look at specific frequencies, or omit data correlated with environmental noise, which then those pre-processed values can be used to define the numerical values of the parameters. Finally, it should be understood that the proposed systems are also compatible with any neural decoding model that is trained to interpret the brain signals, where the raw brain signals would first pass through neural decoding models and interpreted values would come out to define the numerical values of the parameters, as discussed above.

As noted earlier, the proposed systems enable users to remain immersed in their experience while (passively) providing feedback to the system that will be used to engineer or develop a prompt that more closely represents the user's experience-without the user having to break out of the experience to describe the event or their affect. Because it is known that the oscillation of neuronal signals in the brain are indicative of a user's emotional affect, the proposed systems can integrate the expression of a user's experience without requiring their active involvement. For example, if someone has a positive or negative experience when looking at landmark 130, that information should be reflected in how their brain signals oscillate.

Figure 3:
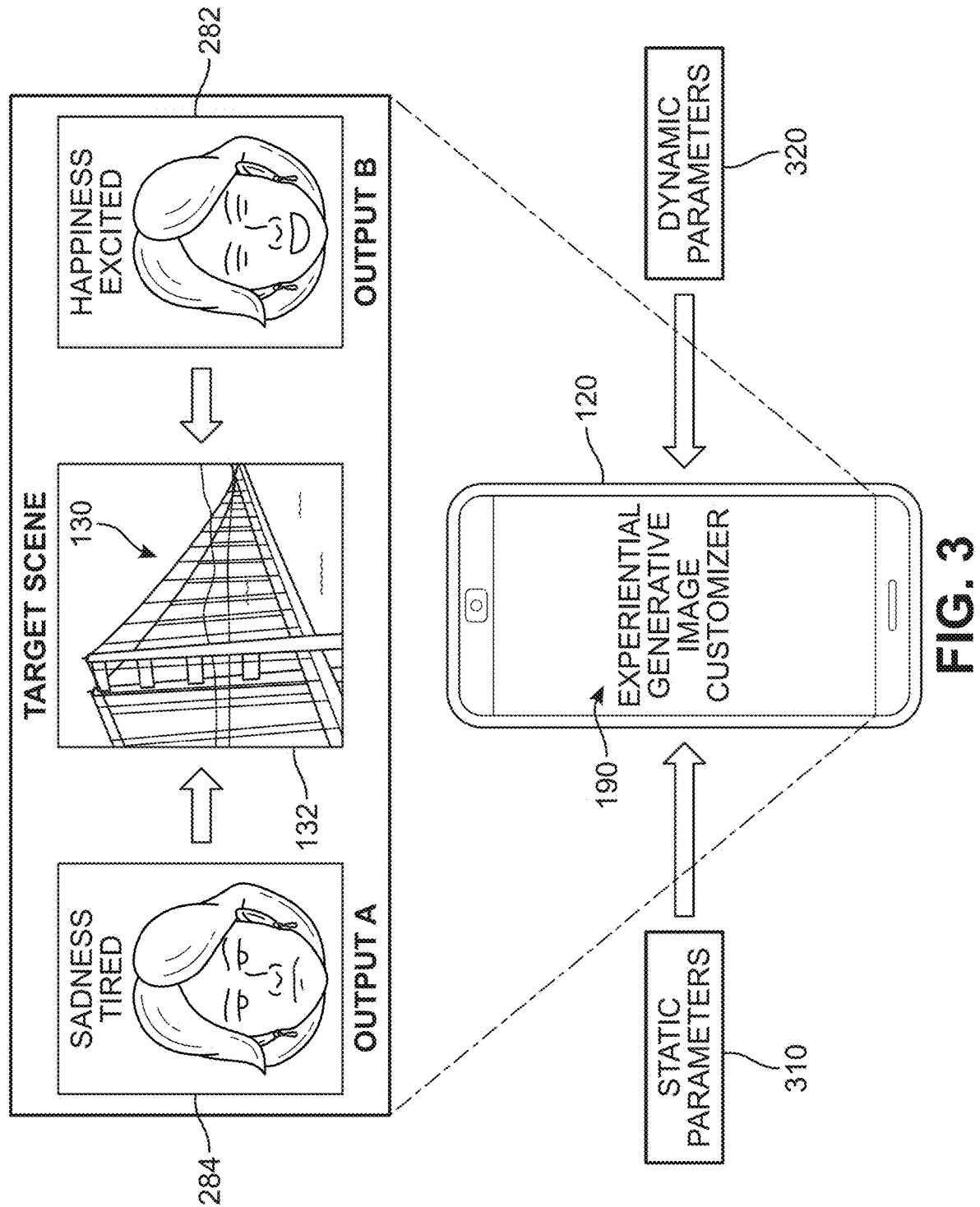
FIG. 3 is a schematic diagram showing examples of inputs that may be provided to an experiential prompt customization image generation system, according to an embodiment.

FIG. 3 shows a schematic diagram where several types of inputs are provided to an input processor of the experiential image app 190, including (a) the recognized emotion from the user's brainwave data (e.g., for purposes of simplicity, shown in this example as comprising one of a sad state 284 and happy state 282), (b) values for a plurality of static parameters 310, and (c) values for a plurality of dynamic parameters 320. In cases where the user is capturing a real-world image at the time the app's generative AI engine is requested to create the customized content, the image captured (photograph 132) can also be provided to serve as the template that will be adjusted, modified, altered, or "tuned" to align with the inputs. For example, the camera can be used to capture an image of the target scene, which can be incorporated by the generative AI as part of an image-to-image prompt pipeline. In other cases, the user may not take a photo, but instead describe the image they want to be tuned with their emotions.

For purposes of clarity, parameters outside of the emotion classification have been defined as corresponding to either static parameters or dynamic parameters, depending on whether the parameter is one that can be modified (dynamic) in response to/to represent the emotions experienced by the user, or will remain fixed (static). For example, most computing devices now include components and sensors that can detect extract geo-location data, and enable precise recordings of parameters such as but not limited to (1) Time, (2) Address/Location, (3) Weather, (4) Temperature, (5) Date/Event, and (6) Point of Interest. It can be appreciated that time of day can be associated with different and specific "moods", as well as weather and temperature. These parameters can therefore be deemed dynamic. On the other hand, the image itself is required to depict/portray a specific location in space, date in time, and a real-world object/person of interest, in order to align with the user's discerned experience of a selected "target scene". Thus, for purposes of the custom image content creation processes described herein, address/location, date/event, and point of interest can be deemed static parameters.

Figure 4:
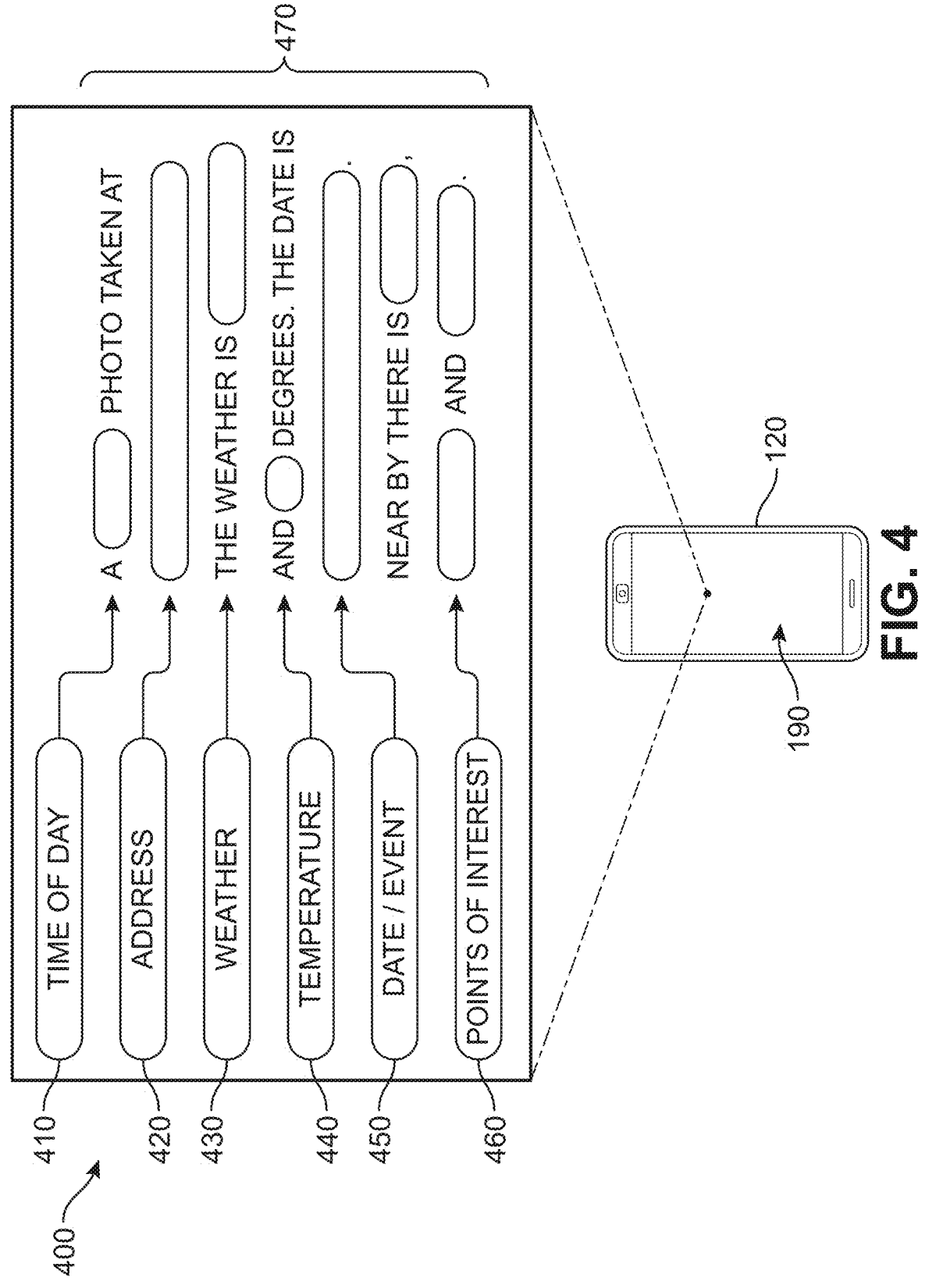
FIG. 4 depicts an example of a prompt template that can be automatically filled by the experiential prompt customization image generation system based on the inputs, according to an embodiment.

As shown in FIG. 4, in different embodiments, upon receiving values for each of these parameters, the system can include provisions for the values for each of these parameters can serve as pieces of a prompt template 400 that can be used to automatically generate or prepare an image, and/or alter or tune an image taken by the user. As a general matter, a prompt refers to the parameters that guide a generative AI model's output and influence its tone, style and quality. Most laypersons will lack the skill in crafting prompts in these AI tools that adequately align with their internal experiences while remaining 'in the zone' of their experience, which can lead to mediocre or subpar results/content from the generative AI.

In different embodiments, the system can receive context data as discussed in FIG. 3 and automatically enter these values into the corresponding fields in the image filter prompt template ("prompt template") 400 created via a Prompt Formatting module of the system. The prompt formatting module can provide static or dynamic templates to organize image and text data captured by the onboard sensors' context detection, as well as define dynamic parameters characterizing bio-sensing/brain-sensing data. In some embodiments, the device 120 can connect with a network and access databases to connect various sensors and/or devices for measuring various parameters (e.g., location, temperature, objects, humidity, etc.). Thus, AI generative workflows incorporate different combinations of these parameters to define the style, objects, and quality of content that will be generated.

In some embodiments, the user can optionally manually/actively customize the prompt template to consider various descriptive features of the environment that are desired. In other words, while in some embodiments the device 120 on which the experiential image app 190 is installed can include various hardware/software components for automatic collection of context detection data-such as a sensor that automatically captures features such as the time, address, weather, temperature, and/or date/event of the target scene—in other embodiments, values for some or all of these inputs could be manually inputted or fine-tuned by user inputs that describe or add text information about the target scene.

Furthermore, as described herein, in different embodiments, the prompt template 400 can be configured as an image filter algorithm that is dynamically customized/modulated by the live brain signals received from the user. In some embodiments, the user's brain activity can adjust the weights that are assigned to each parameter that is used to generate the image. As the user's brain signals change, those numerical values will be sensed and passed to the system to re-define the image filter prompts associated with dynamic parameters and modify or update the image accordingly. Thus, such customization can be accomplished using a person's naturally existing brain signals, rather than manual text modifications of the prompt that require active involvement of the user. This approach therefore allows for a personalized, bio-inspired interaction to define the computational affect of the system without interfering with the user's in-the-moment experience. In other words, in some embodiments, the user's brain's changes in neuronal oscillation from positive to negative affect and back can be tracked and used to modulate numerical values of weights or parameters used in a prompt.

Figure 5:
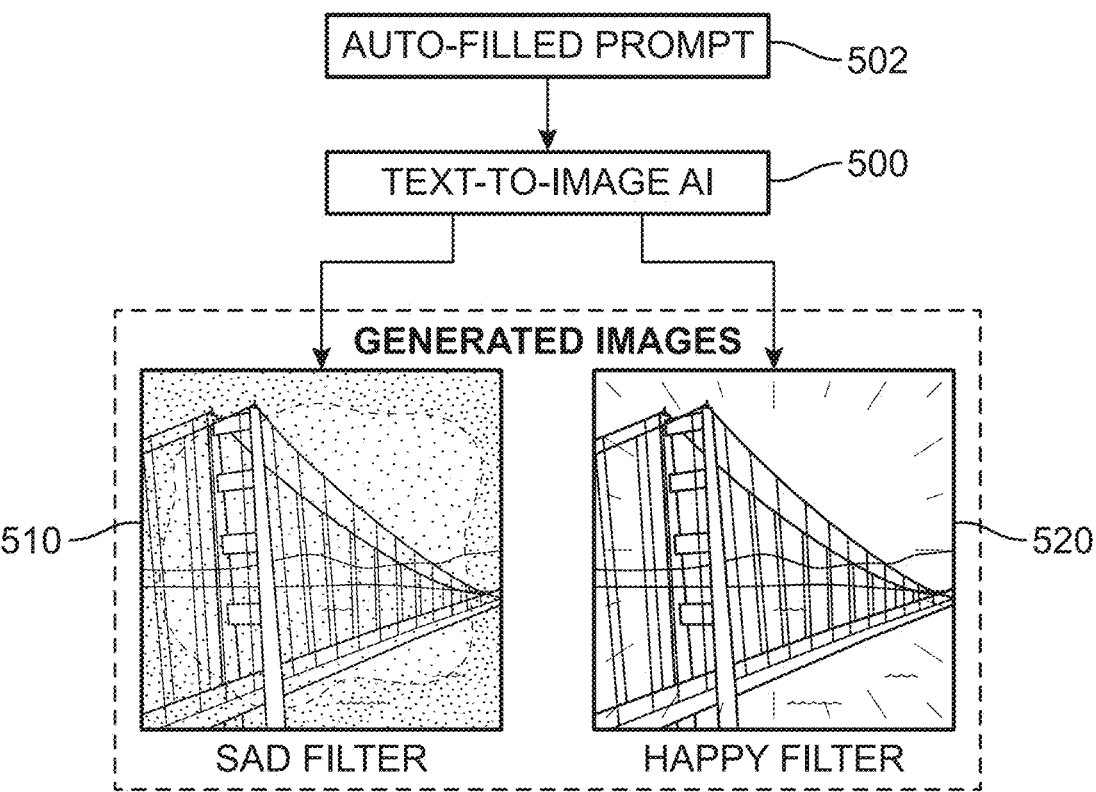
FIG. 5 shows an example of two possible images that can be generated based on the captured image and the user's identified mood, according to an embodiment.

Once the prompt template 400 has been filled in with the assigned values for the user's current experience, it can be passed to a text-to-image AI generator 500 as an auto-filled prompt 502 (or "modified template") that carries values/labels for each designated parameter, as shown in FIG. 5. The text-to-image AI generator 500 can include any foundation model or large language model (LLM)-based algorithm or related generative model that uses prompts (text/image) to generate content.

Figure 7:
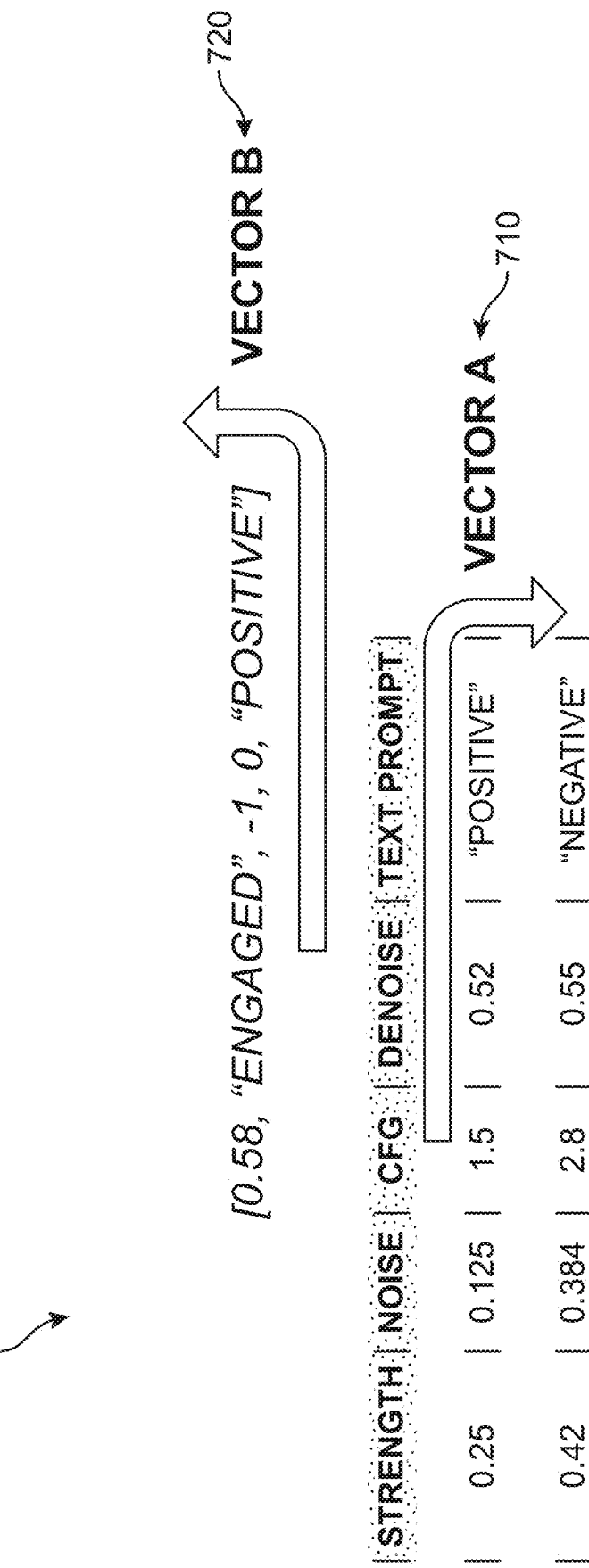

In different embodiments, these parameters can be expressed as numeric variables attached to key locations in the prompt template that have been modulated/personalized in response to the processed data and recognized emotion(s) from the bio-sensing live stream (e.g., see FIGS. 6 and 7). The auto-filled prompt 502 therefore conveys values that are also associated with finely-tuned weights, where each weight assigned reflects the user's particular brain state at the time of their immersion in the real-world experience embodied by the target scene, and represents how the user was feeling at that time.

For purposes of illustration, FIG. 5 shows two different personalized outputs of the text-to-image AI generator 500 of the same target scene in response to two different emotional states that the user may have experienced and were recorded in their brainwave data. In a first image 510, the brainwave data was deemed to include cognitive states of the user feeling sad—and the outcome is an image of the Golden Gate bridge stylized to have sad visual tones. An example of the creation of the first image 510 by the system could include a text prompt such as: "It is a sunny day in San Francisco with a view of the Golden Gate bridge" with added text labels of bio-sensing streams: "It is a sunny day in San Francisco [but the mood is] [somber*(0.75)] with a view of the Golden Gate Bridge". A user story that could be associated with this output could be expressed as: "I am visiting San Francisco and stop to see the Golden Gate bridge. I use my prompt-to-image camera to capture the scene. The experiential image app connects my brain signals to my camera and generates a [sad face emoji] version of the scene when I am having a sad day."

In an alternate second image 520, the brainwave data was different, and instead deemed to include cognitive states of the user feeling happy—and the outcome is an image of the Golden Gate bridge stylized with happy visual tones. An example of the creation of the second image 510 by the system could include a text prompt such as: "It is a sunny day in San Francisco with a view of the Golden Gate bridge" with added text labels of bio-sensing streams: "It is a sunny day in San Francisco [and the mood is] [cheerful*(0.80)] with a view of the Golden Gate Bridge". A user story that could be associated with this output could be expressed as: "I am visiting San Francisco and stop to see the Golden Gate bridge. I use my prompt-to-image camera to capture the scene. The experiential image app connects my brain signals to my camera and generates a [happy face emoji] version of the scene when I am having a good day."

In either scenario, a user may find that if they actively try to describe how they feel about an experience they are having in the real-world, they would actually diminish the enjoyment of (or other internal response to, such as nostalgia) the experience itself. In other words, as an example, if the person were to interact with an AI such as ChatGPT to describe their mental/emotional state while they gazed at a particular target object or scene, they will find their mental state changing from one of immersive experience to analysis. Ironically, in trying to express themselves and provide a prompt to a model, they dilute the very experience they are trying to describe, and are no longer fully immersed in the experience.

However, using the proposed systems, the user-whether sad, happy, or experiencing some other mood-need not describe their feelings or try to manually capture and relay their internal responses. Instead, they can continue to remain immersed in the act of perceiving their environment, while a continuous stream of biodata is transmitted to the device and used to transform the objective "real-world" image to a stylized rendering that conveys a deeply personal experience. More specifically, it can be observed that when feelings of sadness were applied to the prompts, the image can lean toward cool tones (blues, greens, purples) to convey calmness, serenity, or melancholy. On the other hand, when feelings of happiness were applied to the prompts, the image could lean toward warm tones.

As a general matter, the proposed systems can include techniques and protocols based on color psychology, the study of how colors can affect how humans feel and think. Colors are often described in terms of hue, saturation, and lightness (HSL). Hue refers to the pure colors that are visible in a rainbow. Further, a color with a higher intensity is said to be pure. Finally, saturation describes the amount of brightness a color appears in an image. In contrast, lightness tells how dark or light a specific color is. Each of these qualities can be affected/modulated in the generated image in response to the emotion(s) recognized in the brainwave data to better convey the experience of the user using specific color schemas and stylistic filters. In other words, the brain activity can be used to tweak or modify the intensity of the different attributes of the image.

For example, with respect to saturation, a lack of color saturation yields a grayscale or black-and-white photo, while a full-color image might be highly saturated. An image appears muted when its saturation is reduced to bleach its colors. However, this effect can convey a somber or constrained emotion through the picture. On the other hand, saturated colors indicate a jubilant mood. Therefore, the system can be configured to vary the saturation based on the feeling that was detected.

Although there are some aspects of images that can affect people individually, as a whole, there are universal neurological principles that determine which hues elicit different feelings. For example, typically when a person thinks of a bright, sunny yellow—it might make them feel happy or energetic, while deep blues might feel calming or maybe a bit sad. In other words, warm (like reds, oranges, and yellows): colors often bring feelings of warmth, energy, and excitement (e.g., a fiery sunset or the glow of autumn leaves). In photography/image creation, using these colors can create an upbeat, vibrant mood, making the viewer feel closer or more engaged with the image. On the other hand, cool (like blues, greens, and purples) shades are often linked with feelings of calmness, relaxation, or sometimes even melancholy (e.g., the tranquility of a deep blue ocean or the peacefulness of a forest). The system can be configured to use these hues to bring a soothing, distant, or reflective mood to the outputted image. Furthermore, neutral colors can be used to focus attention, create contrast, or set a subdued mood without overwhelming the viewer with strong emotional cues. These selections can be made and applied to an image automatically by the system in direct response to the passively collected, continuous brain signals.

Thus, color selection when generating the custom content is significant because they can be linked to human emotions, as influenced by biology. Human eyes and brain process these hues, making us feel a certain way. For instance, green can be calming, while bright red might signal danger. In different embodiments, the system can also be modified based on which region/culture is employing the technology. This is because cultural experiences can also play a role in color and mood. For example, to some cultures, white suggests tranquility, while to others, it represents sorrow. Similarly, a shade like blue might relax one individual from a first culture, but signify luxury to another person of another culture.

For purposes of reference, one protocol of color transformation in response to brain data indicating a specific mood is provided here: (1) Red-Often tied to strong emotions, red can represent love, passion, and energy. But it can also signal danger or a need for caution; (2) Blue-calm and peace. However, blue can also represent sadness or introspection; (3) Green-brings to mind growth, renewal, and life. It can also symbolize calmness and relaxation; (4) Yellow-Bright and cheerful yellow is the color of sunshine, happiness, and optimism. Overuse of yellow can feel overwhelming or signal caution; (5) Purple-A blend of the calmness of blue and the energy of red, purple often stands for creativity, luxury, and even mystery; (6) Orange-Vibrant and lively, orange can evoke feelings of excitement, enthusiasm, and warmth; (7) Black-Classic and sophisticated, black can symbolize elegance, power, or mystery. But it can also represent mourning or an end; (8) White—The color of purity, simplicity, and clarity, and can also be used to signify a fresh start or cleanliness; (9) Brown-Grounded and reliable, brown is the color of the earth, symbolizing stability, comfort, and wholesomeness; and (10) Gray-Neutral and balanced, gray sits between black and white, often representing compromise, calm, and timeless elegance. In other embodiments, this color-mood palette can be changed to reflect individual tastes, styles, and cultures. However, as a whole, warm colors such as red and orange can create a sense of comfort, happiness, and intimacy, while cool colors such as blue and green can create a sense of calmness, serenity, and tranquility.

In some embodiments, the system can apply one or more image filters that reflect the detected stream of emotion(s). In one example, the system can use the Gaussian Blur filter to create a soft and dreamy mood when appropriate, the Add Noise filter to create a gritty and vintage mood, or the Lens Distortion filter to create a dramatic and cinematic mood. For example, natural light during different times of day can have a significant impact on the color temperature and mood of a photo. As one example, during the "golden hour" (the hour after sunrise and the hour before sunset), the light is warmer and more yellow, creating what is perceived by most humans as a beautiful and inviting mood. In contrast, during midday, the light is cooler and bluer, creating what is perceived as a more clinical and sterile mood. A technique known as silhouetting can also be used by the system to create a sense of drama and mystery in an image. By obscuring the subject's features and leaving them in shadow, a sense of intrigue and suspense can be provided in the image. In still other embodiments, the generative AI can transform the original target scene based on weather (e.g., drizzle rain to correspond to sadness, bright sun to correspond to happiness, stormy evening to correspond to anger, etc.) that is artificially layered onto the target scene.

In this way, the system can generate content that is deeply personalized. Rather than rely on an active engagement process by the user, who must provide specific, descriptive prompts to generate rich text, images, videos, and 3D assets, the disclosed systems can greatly automate and streamline the prompt customizing process. For example, a user can write/engineer a prompt for ingestion by the generative AI (and/or or capture a photo for modification by the generative AI) while simultaneously recording their brain signals. Their brain state—as determined by the brain signals—can act as a live update to parameters attached to the prompts inputted by the user. In one embodiment, there can be one or more parameters that can track or follow positive emotional affect, and one or more parameters that can track or follow negative emotional affect. Therefore, when the user is feeling positive (or good), that parameter shows/reflects positive values. Those different positive values will then change the expression of the written prompt to generate images and content reflecting the mental state of the user. Similarly, when the user is feeling negative (or bad), that parameter shows negative values. Those different negative values will then change the expression of the written prompt to generate images and content reflecting the mental state of the user.

For purposes of clarity, some technical details regarding the proposed systems will now be provided with reference to FIGS. 6 and 7. In different embodiments, as brainwave data is obtained (e.g., via the EEG headset) and processed, numerical values can be used to reflect the user's cognitive state/mood. More specifically, in some embodiments, the informational stream generated based on the user's bio-signals can be used to define a convolutional interaction of two vectors. For reference, these two vectors will be identified herein as "Vector A" and "Vector B". Vector A holds the subject variable values of a selected mask array of generative workflow parameters. In addition, Vector B are the values of parameters corresponding to a live stream of bio-metric data (e.g., EEG data).

FIG. 6 presents some non-limiting examples of parameters that could be harvested and defined by the proposed system for purposes of generating custom user-mood-based image content. Vector A parameters 610 can include, for example, categories of input image parameters 620, text prompt parameters 630, and model parameters 640. Input image parameters 620 can encompass, for example, subcategories of image content (e.g., style, objects, color schemas, etc.), resolution, and preprocessing variables (e.g., cropping, color correction, noise reduction, etc.). Other categories include the text prompt parameters 630 as discussed in FIG. 4, and model parameters 640, which can encompass sub-categories including but not limited to temperature, seed, strength, temperature, positive prompt, negative prompt, etc.

In addition, Vector B parameters 650 can include, for example, categories of measured numerical values 660, binary classification states 670, multi-class classification 680, correlation coefficients 690, and decoded informational units 692. In different embodiments, values within each of those categories can include Softmax probabilities for cognitive states such as cognitive load, engagement, fatigue, excitement, relaxation, etc. In addition, there can also be included binary probabilities of the positive and negative valance of states such as happy vs. sad, stressed/worried vs. relaxed, disgust vs. appetizing, enthused vs. afraid, calm vs. angry, frustrated vs. peaceful, etc.

In different embodiments, both raw numerical values and correlation coefficients can also be used to interact with the parameters in Vector A such as in mappings that demonstrate specific ratios of correlation values defining stylized categories. For example, values of cognitive states related to a user being sad can change the strength of a neural network structure for control of diffusion models (e.g., ControlNet model) in the generative workflow that transfers color schemas of sad imagery related to the user context.

Furthermore, in some embodiments, relevant values from Vector B parameters 650 can also include text labels to be used as prompts such as user context updates to text prompt parameters in generative workflows. These text prompts can also come from decoded informational units 692 which can be classification labels from classifiers 694 such as decoded visual perception, auditory perception, and motor action. For example, if the user is looking at or visualizing a bird in their head, a visual perception classifier can detect the label of bird as text. Similarly, if a user is listening to a song or imagining a song they know in their head, an auditory perception classifier can detect the label of the song as text. In addition, a person can also intend to produce certain vocabularies of words and that signal can be interpreted from neuro-muscular signals, such as a person who is paralyzed attempting to say the word "hello". Such a word can be detected from neuro-muscular signals via a motor action classifier and then used as a text prompt.

Based on the values obtained for Vector A and Vector B, the system can perform a convolutional interaction of both vectors using an algorithmic engine (e.g., a convolution between Vector A and Vector B). One example of this convolution is presented below with respect to Equation (1):

$$\left( w[k] = \sum{}_{-j} A[j] * B[k-j+1] \right) \qquad \text{Equation (1)}$$

where w[k]: represents the element at index k, as the updated value used to define the parameters in the generative workflow, A[j]: represents the element at index j of the first Vector A, B[k−j+1]: represents the element at index (k−j+1) of the reversed second Vector B, Σj: represents the summation over all possible values of j, and *: denotes element-wise interaction.

In Equation (1) above, the element wise interaction is sometimes by default a strict multiplication of two number values. However, the proposed techniques are not limited in such a matter, and allows or enables the element wise interactions to occur as additive processes, processed by neural networks such as multilayer perceptrons or convolutional neural nets, approximation functions, or heuristic processes. For reference, FIG. 7 shows a visualization 700 of a sample excerpt of the convolution process between Vector A 710 and Vector B 720.

Figure 8:
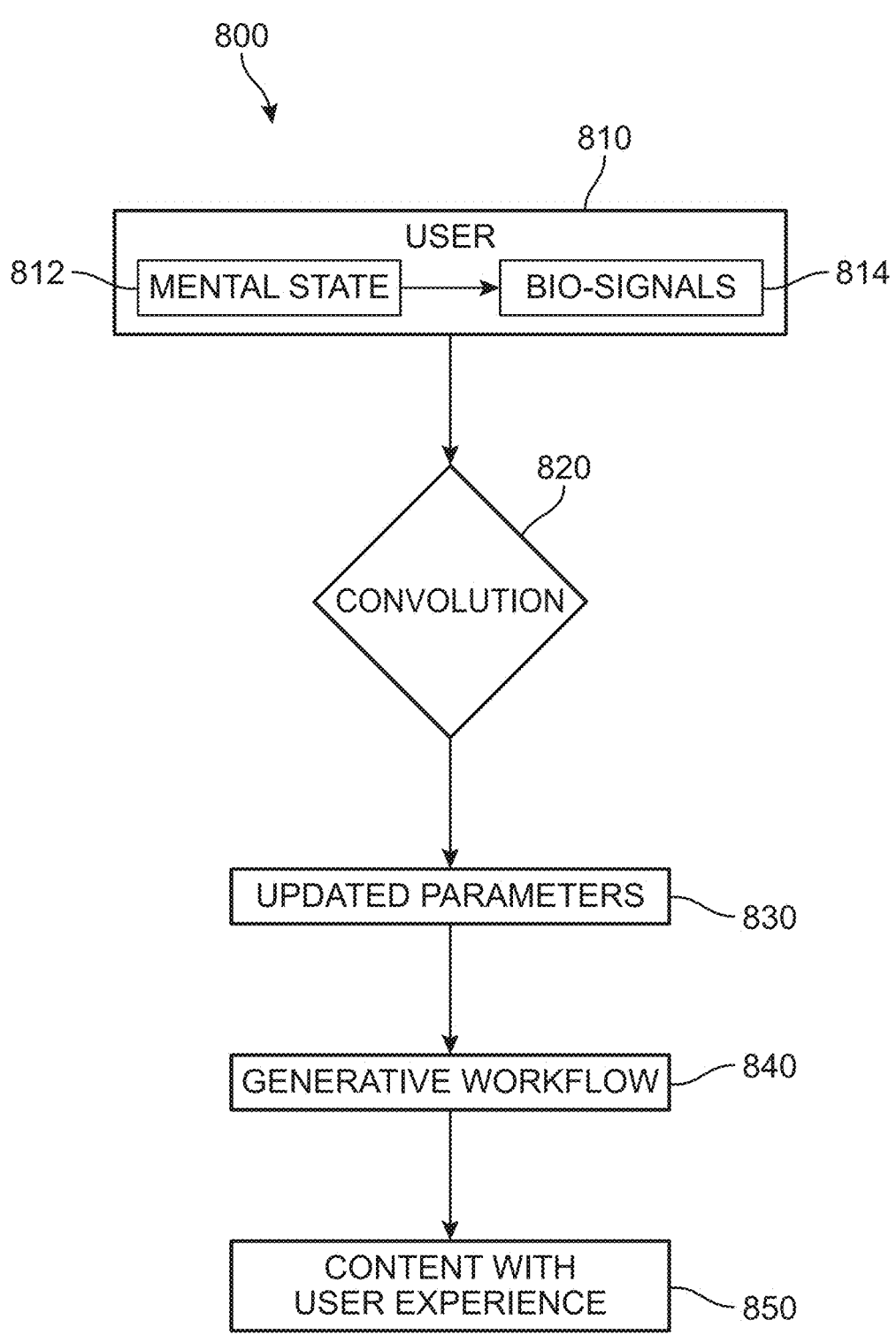
FIG. 8 shows an overview of the custom content generation process, according to an embodiment.

FIG. 8 provides a process overview 800 of an embodiment of the proposed methods. As described above, a person can experience different mental states 812, which can be physiologically manifested as bio-signals 814. At a first stage 802, the bio-signals 814 corresponding to or representing a particular mental state can be collected. In a second stage 820, these bio-signals 814 are passed to a convolution neural network, which can generate an updated set of parameters in a third stage. At a fourth stage 840, the generative AI engine can receive the updated parameters and, at a fifth stage 850, output customized content based on or shaped by the user experience defined by bio-signals 814.

Figure 9:
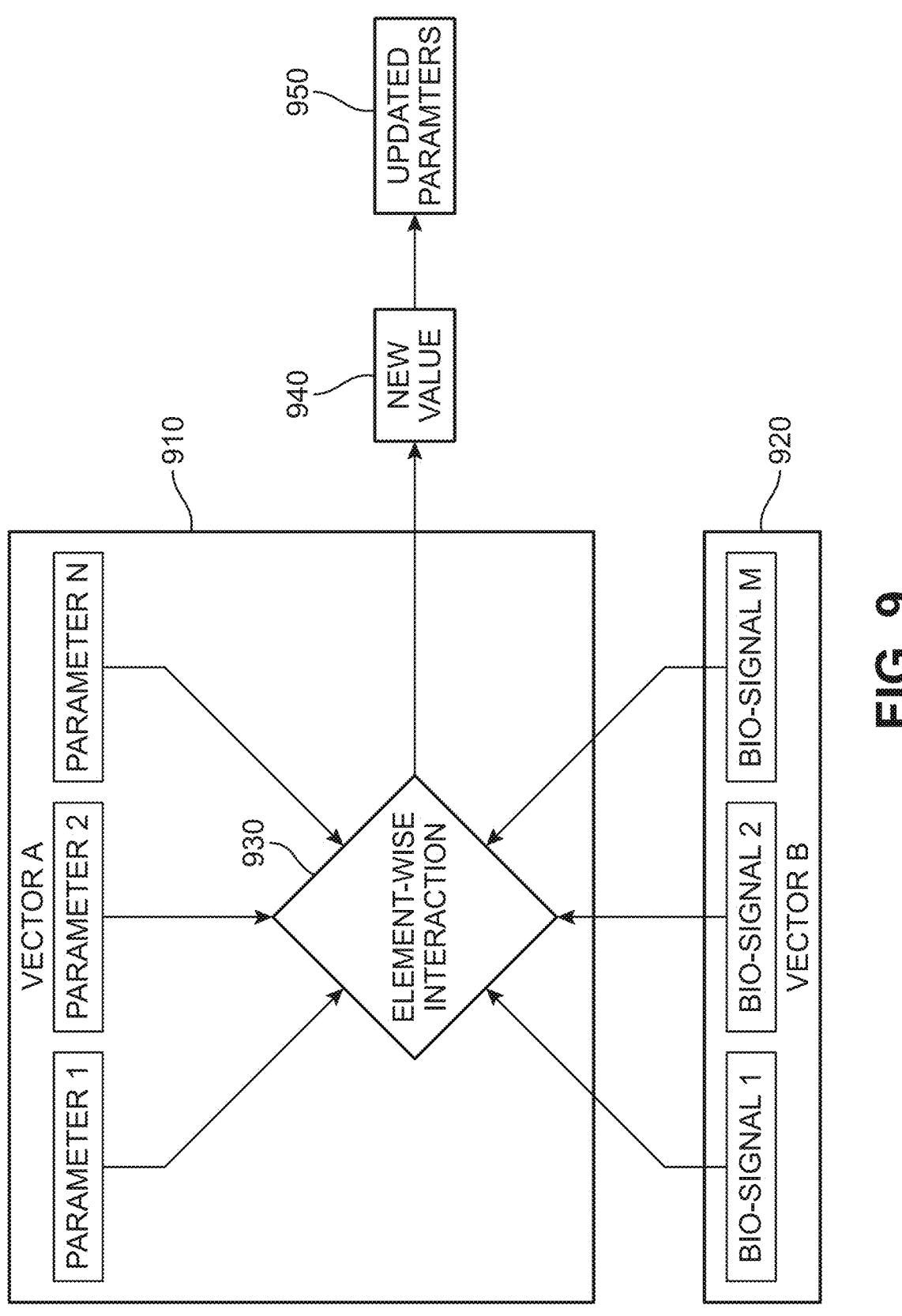
FIG. 9 presents an example of the convolution process that can be applied by the proposed system, according to an embodiment.
Figure 10:
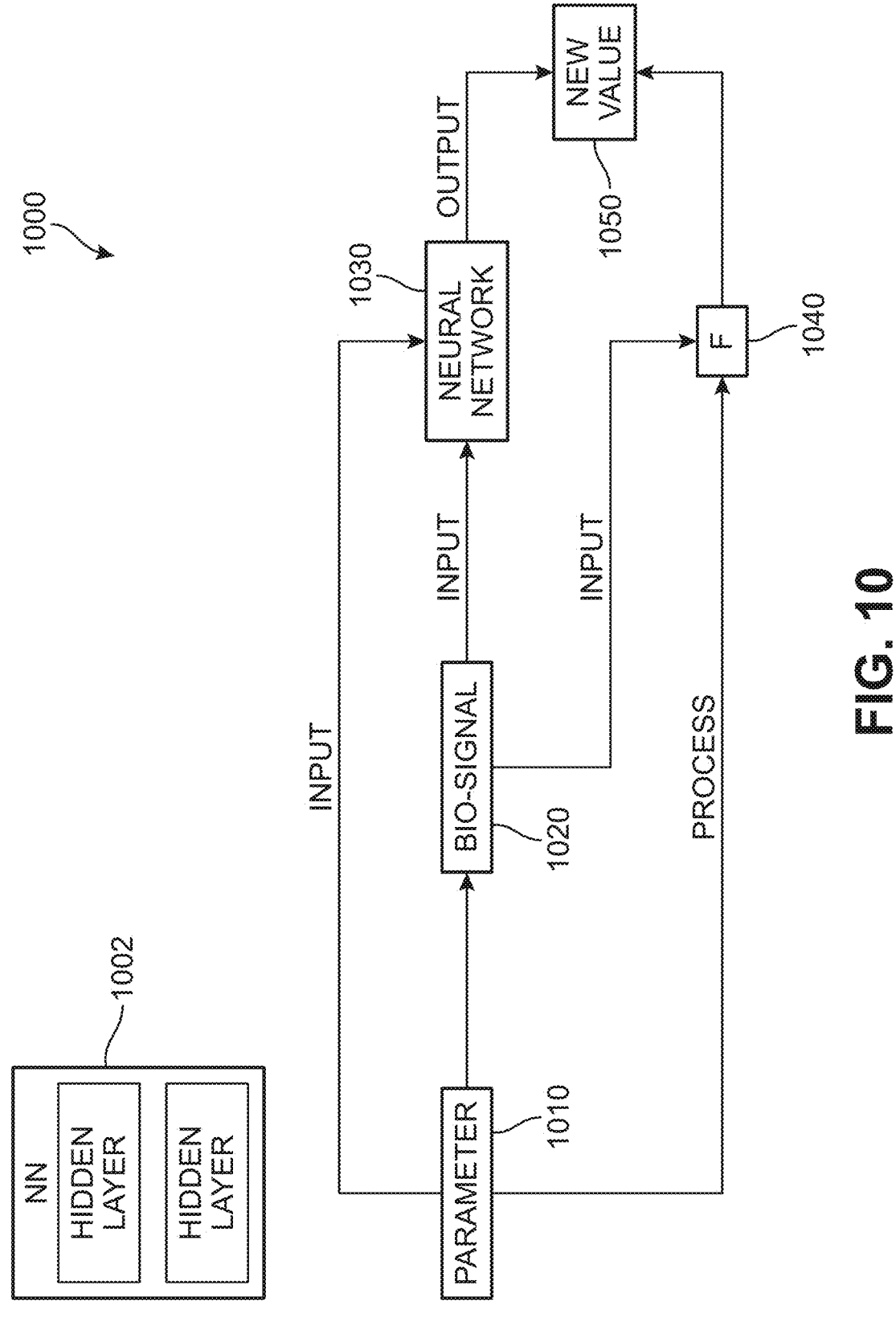
FIG. 10 shows an example of an element-wise interaction that can be performed during convolution, according to an embodiment.

Moving to FIG. 9, a flow diagram 900 presents an example of the convolution process that can be implemented at the second stage 820 of FIG. 8. It can be seen that the inputs encompass both Vector A parameters 910 and Vector B bio-signals 920, as described earlier with respect to FIGS. 6 and 7. In different embodiments, these two vectors can be passed through an element-wise interaction 930 to produce, for each interaction, a new value 940 that can be entered or stored as updated parameters 950 (e.g., see FIG. 4). More specifically, in different embodiments, and as illustrated in an element-wise interaction diagram 1000 in FIG. 10, for each individual parameter 1010, bio-signal 1020 can be applied and together passed through neural network 1030 (e.g., deep learning-based hidden layer neural network 1002). Inputs created from the parameter 1010 and bio-signal 1020 then are used to derive a function F 1040 and combined with the output of the neural network 1030 to produce a new parameter value 1050.

Figure 11:
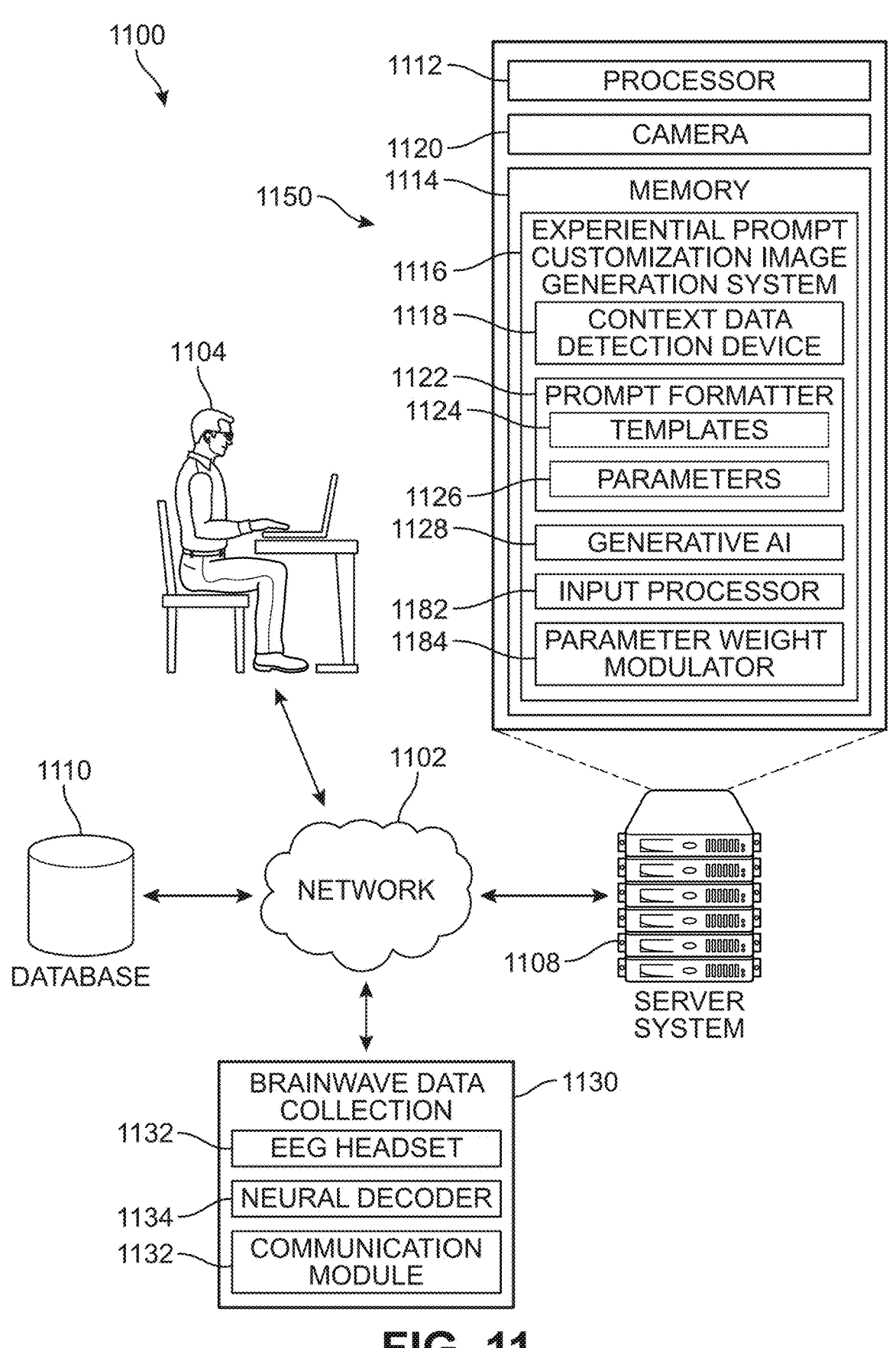
FIG. 11 is a diagram depicting example environments and components by which systems and/or methods, described herein, may be implemented, according to an embodiment.

For purposes of clarity, one example of an environment 1100 for implementation of the proposed systems is depicted in FIG. 11, according to an embodiment. The environment 1100 may include a plurality of components capable of performing the disclosed method of dynamic prompt customization and image modulation. For example, environment 1100 includes a first user device 1104, computing system 1108, a network 1102, and a knowledge base 1110. The components of environment 1100 can communicate with each other through network 1102. In some embodiments, network 1102 may be a wide area network ("WAN"), e.g., the Internet. In other embodiments, network 1102 may be a local area network ("LAN").

As shown in FIG. 11, an experiential prompt customization image generation system 1116 may be hosted in computing system 1108, which may have a memory 1114 and a processor 1112. Processor 1112 may include a single device processor located on a single device, or it may include multiple device processors located on one or more physical devices. Memory 1114 may include any type of storage, which may be physically located on one physical device, or on multiple physical devices. In some cases, computing system 1108 may comprise one or more servers that are used to host the experiential prompt customization image generation system 1116 and its associated modules (context detection device/sensors/module 1118, input processor 1182, camera and image processing module 1120, parameter weight modulator 184, prompt formatter system 1122 (with prompt templates 1124 and parameters 1126), and generative AI model 1128).

In different embodiments, database 1110 may store data that may be retrieved by other components for system 1100, such as prompt templates, training data, and other features that can be referenced by the generative AI. In some embodiments, the database 1110 includes a knowledge repository that can be used by context detection device/module 1118 to determine how sensor data should be translated into specific parameter values. In addition, a brainwave data collection system 1130 can be used to collect user brain state data via an EEG headset 1132. This data can be decomposed, processed, and interpreted at a neural decoder module 1134. The neural decoder module 1134 can include data processing techniques that prepare the raw EEG brain signals, which are a complex waveform that includes brainwaves as well as artifacts such as electrical activity of nearby muscles, electrode motion interference, and/or ambient noise. Thus, in some embodiments, the neural decoder module 1134 can be configured to ensure the data is filtered and pre-processed, and/or made ready for further analysis by downsampling, bandpass filtering, epoch of the data and removal of noisy epochs, removal of noisy components, general artifact rejection/suppression, etc. For example, in one embodiment, a proposed pre-processing pipeline can include several general stages, including filtering, an adaptive technique for artifact removal, interpolation, and independent component analysis (ICA) to remove the artifactual components. The brainwave data can then be further processed by a signal decomposer that performs extraction and separation of signal components from the composite signals. In addition, the brainwave data can be segregated or otherwise classified for use by a bandwidth classification model to determine specific types of information such as but not limited to bandwidth/frequency domain. In some embodiments, the bandwidth classifier can then divide each EEG channel into a plurality of sub-bands based on its frequency range (e.g., Delta, Theta, Alpha, Gamma, and Beta). The processed, clean brain data is then shared with the experiential prompt customization image generation system 1116 via communication module 1136 over network 1102 or a wired connection.

While FIG. 11 shows a single user device, it is understood that more user devices may be used. For example, in some embodiments, the system may include two or three user devices. In some embodiments, the user device may be a computing device used by a user. For example, first user device 1104 may include a smartphone or a tablet computer. In other examples, first user device 1104 may include a laptop computer, a desktop computer, and/or another type of computing device. The user devices may be used for inputting, processing, and displaying information. The number and arrangement of components shown in FIG. 11 are provided as an example. In practice, the system may include additional components, fewer components, different components, or differently arranged components than those shown in FIG. 11. Additionally, or alternatively, a set of components (e.g., one or more components) of the system may perform one or more functions described as being performed by another set of components of the system 1100.

For purposes of clarity, FIG. 12 of the drawings presents one example of a process 1200 by which the proposed techniques may be implemented. As shown in FIG. 12, at a first stage 1210, a user may 'don' or otherwise equip themselves with a wearable brainwave collection device or headset (either consumer grade or research grade hardware).

The headset can be understood to be in communication with a software application (running on a computing device) that includes some or all of the components and modules of the environment 100 described above, such as an LLM model (e.g., Stable Diffusion). At a second stage 1220, the user may focus on a Target Scene (e.g., The Golden Gate Bridge or other monuments, a cat, the sunset, a car, a building, the sky, a lake, mountains, etc.). At a third (optional) stage 1230, the user can also capture an image of the target scene using their camera. At or around this time, the user can record their brain activity in a fourth stage 1240. At this time the user's brain signals are being live-streamed via the headset to the software application that may be running on their mobile device. This data will be used by the system to adaptively modulate prompt weights and parameters.

At a fifth stage 1250, the user can manually or automatically trigger a Context Detection event (e.g., whereby the geolocation information of the target scene and the associated metadata is obtained, such as the Golden Gate Bridge at that time and moment). Thus, in this example, Context Detection propagates text data or image and text data (e.g., the address, time, temperature, etc.). It can be appreciated that some of these parameters will be dynamic (e.g., weather, temperature, day/night, season, etc.), while other parameters will be static (e.g., longitude, latitude, or other GPS coordinates, time, day, etc.). In some embodiments, the system further applies Prompt Formatting techniques to organize the incoming text data. At a sixth stage 1260, the bio-sensing parameters can interact with the prompt parameters as descriptive values to modulate the sensed context.

As an example, the same prompt being modulated in response to two different brain states is listed here: (1) The weather is [Sunny] and with a [Positive (x59%)] atmosphere. (2) The weather is [Sunny] and with a [Negative (x88%)] atmosphere. These types of resultant 'filled-in' prompt templates can then be passed as a prompt to a generative AI model in a seventh stage 1270. Finally, the generative AI model outputs an image customized by the user's brain state as an experiential image in an eighth stage 1280. Although the discussion herein focused primarily on the output of an image, it can be appreciated that in different embodiments, other outputs including video, 3D assets, music, text, etc. can be created by the generative AI model that was customized by the user's brainwaves and thereby reflect the mental state of the user.

FIG. 13 is a flow chart illustrating an embodiment of a computer-implemented method 1300 of generating personalized image content. The method 1300 includes a step 1310 of receiving, at a computing device, a first image of a target scene captured by a camera at a first time. A second step 1320 includes receiving, at the computing device, a first bio-signal data stream for a first user collected at or around the first time. A third step 1330 includes identifying, at the computing device, a first mood associated with the first user based on the first bio-signal data. In addition, a fourth step 1340 includes creating a first prompt based on both the first image and the first mood, the first prompt including a set of parameters, wherein a weight assigned to each parameter is modulated based on the identified first mood. A fifth step 1350 includes passing or applying the first prompt through a generative artificial intelligence (AI) to generate a second image that includes aspects of the target scene that have been imbued with stylistic elements that represent the first mood.

In other embodiments, the method may include additional steps or aspects. In one example, the first bio-signal data stream is collected via a BCI device worn by the first user. In some embodiments, the first bio-signal data is EEG data.

In another embodiment, identifying the first mood includes passing the first bio-signal data stream through an emotion recognition classifier. In different embodiments, the set of parameters includes time of day, temperature, and weather. In some embodiments, the set of parameters includes geo-location, date, and point of interest. In one embodiment, modulation of the weight assigned to each parameter in the first prompt causes the generative AI to adjust values of one or more of a hue, saturation, and lightness associated with the target scene. In some embodiments, modulation of the weight assigned to each parameter in the first prompt causes the generative AI to apply an image filter to the target scene.

As described herein, the proposed systems can allow users to capture very basic yet deeply personal about their experience without requiring the user's active involvement. The prompt that is automatically engineered by the system is customized, and the weights applied to each parameter in the prompt modulated so it reflects how the user was feeling or experiencing at the time they viewed the target scene. Rather than require the user to interrupt their contemplation or other interaction with the real-world to create a prompt that describes their emotions or affect, which can be totally inaccessible to the user for various reasons, the system can automatically collect the user's brain signals to serve as a proxy of the user's expressions. These signals are converted into numerical values that are used to weight the specific words that describe the target scene (e.g., sunny, rainy, windy, cold, etc.). Thus, if a user captured a sunny day in San Francisco, and their brain signals were moving at a very specific rhythm, the brain activity will be used by the system to have an effect on the intensity of the word sunny in the prompt, rather than ask the user to explain the specifics of what sunny means in that moment. If the user was determined to be feeling happy this would result in the application of a 'happy filter' on the word sunny, while if the user was determined to be feeling sad, that would instead result in the application of a 'sad filter' on the same word sunny. Other filters would also be applicable (e.g., sleepy filter, contemplative filter, alert filter, angry filter, etc.) that could be used by the generative AI to shape how the final image would appear or would be rendered, allowing each output to uniquely represent how the user was feeling ("their vibe") while experiencing the designated target scene/object.

The proposed techniques can thereby add validity to the vision of a rise in tech products that leverage human bio-sensing to increase their contextual-awareness of users. Specifically, by leveraging the neuro and bio-signals of users to understand the user without disrupting their experience to ask questions or measure it, users of Mixed Reality/Augmented Reality products can be equipped to generate personalized media content that includes insights from their mental/cognitive states, sentiment, and emotions. This can facilitate the availability of tools that incorporate the design and creation of content based on individual experiences by including the brainwave data of user experiences in real to near-real-time.

For purposes of this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons/options or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with the user interface, or other such information presentation.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Embodiments may include a non-transitory computer-readable medium (CRM) storing software comprising instructions executable by one or more computers which, upon such execution, cause the one or more computers to perform the disclosed methods. Non-transitory CRM may refer to a CRM that stores data for short periods or in the presence of power such as a memory device or Random Access Memory (RAM). For example, a non-transitory computer-readable medium may include storage components, such as, a hard disk (e.g., a magnetic disk, an optical disk, a magneto-optic disk, and/or a solid-state disk), a compact disc (CD), a digital versatile disc (DVD), a floppy disk, a cartridge, and/or a magnetic tape.

To provide further context, in some embodiments, some of the processes described herein can be understood to operate in a system architecture that can include a plurality of virtual local area network (VLAN) workstations at different locations that communicate with a main data center with dedicated virtual servers such as a web server for user interfaces, an app server for OCR and data processing, a database for data storage, etc. As a general matter, a virtual server is a type of virtual machine (VM) that is executed on a hardware component (e.g., server). In some examples, multiple VMs can be deployed on one or more servers.

In different embodiments, the system may be hosted at least in part in a cloud computing environment offering ready scalability and security. The cloud computing environment can include, for example, an environment that hosts the document processing management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource"). It is contemplated that implementations of the present disclosure can be realized with appropriate cloud providers (e.g., AWS provided by Amazon™, GCP provided by Google™, Azure provided by Microsoft™, etc.).

The methods, devices, and processing described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims In addition, the system can include one or more devices capable of receiving, generating, storing, processing, and/or providing information, such as information described herein. For example, the system may include one or more computing devices, such as one or more server devices, desktop computers, workstation computers, virtual machines (VMs) provided in a cloud computing environment, or similar devices. The systems can be configured to exchange information over one or more wired and/or wireless networks. For example, networks may include a cellular network, a public land mobile network (PLMN), a local area network (LAN), a personal area network (PAN) such as Bluetooth, a wide area network (WAN), a metropolitan area network (MAN), a telephone network (e.g., the Public Switched Telephone Network (PSTN)), an ad hoc network, an intranet, the Internet, a fiber optic-based network, a cloud computing network, a private network, and/or a combination of these or other types of networks.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of generating personalized image content, the method comprising:

receiving, at a computing device, a first image of a target scene captured by a camera at a first time;

receiving, at the computing device, a first bio-signal data stream for a first user collected at or around the first time;

identifying, at the computing device, a first mood associated with the first user based on the first bio-signal data;

creating a first prompt based on both the first image and the first mood as a user expression, the first prompt including a set of parameters, wherein a weight assigned to each parameter is modulated based on the identified first mood, wherein creating the first prompt comprises:

automatically collecting the first bio-signal data stream of a user, wherein the first bio-signal data stream serves as a proxy of the user expression, converting the first bio-signal data stream into numerical values, applying the numerical values to weigh one or more descriptive words associated with the target scene;

providing the first prompt based on determining an intensity of word from the one or more descriptive words associated with the target scene; and passing the first prompt through a generative artificial intelligence (AI) engine to generate a second image that includes aspects of the target scene that have been imbued with stylistic elements that represent the first mood.

2. The method of claim 1, wherein the first bio-signal data stream is collected via a Brain-Computer Interface (BCI) device worn by the first user.

3. The method of claim 1, wherein identifying the first mood includes passing the first bio-signal data stream through an emotion recognition classifier.

4. The method of claim 1, wherein the set of parameters includes time of day, temperature, and weather.

5. The method of claim 1, wherein the set of parameters includes geolocation, date, and point of interest.

6. The method of claim 1, wherein modulation of the weight assigned to each parameter in the first prompt causes the generative AI to adjust values of one or more of a hue, saturation, and lightness associated with the target scene.

7. The method of claim 1, wherein modulation of the weight assigned to each parameter in the first prompt causes the generative AI to apply an image filter to the target scene.

8. A non-transitory computer-readable medium storing software comprising instructions executable by one or more computers which, upon such execution, cause the one or more computers to generate personalized image content by:

receiving, at a computing device, a first image of a target scene captured by a camera at a first time;

receiving, at the computing device, a first bio-signal data stream for a first user collected at or around the first time;

identifying, at the computing device, a first mood associated with the first user based on the first bio-signal data;

creating a first prompt based on both the first image and the first mood, the first prompt including a set of parameters, wherein a weight assigned to each parameter is modulated based on the identified first mood, wherein creating the first prompt comprises:

automatically collecting the first bio-signal data stream of a user, wherein the first bio-signal data stream serves as a proxy of the user expression, converting the first bio-signal data stream into numerical values, applying the numerical values to weigh one or more descriptive words associated with the target scene;

providing the first prompt based on determining an intensity of word from the one or more descriptive words associated with the target scene; and passing the first prompt through a generative artificial intelligence (AI) engine to generate a second image that includes aspects of the target scene that have been imbued with stylistic elements that represent the first mood.

9. The non-transitory computer-readable medium of claim 8, wherein the first bio-signal data stream is collected via a BCI device worn by the first user.

10. The non-transitory computer-readable medium of claim 8, wherein identifying the first mood includes passing the first bio-signal data stream through an emotion recognition classifier.

11. The non-transitory computer-readable medium of claim 8, wherein the set of parameters includes time of day, temperature, and weather.

12. The non-transitory computer-readable medium of claim 8, wherein the set of parameters includes geolocation, date, and point of interest.

13. The non-transitory computer-readable medium of claim 8, wherein modulation of the weight assigned to each parameter in the first prompt causes the generative AI to adjust values of one or more of a hue, saturation, and lightness associated with the target scene.

14. The non-transitory computer-readable medium of claim 8, wherein modulation of the weight assigned to each parameter in the first prompt causes the generative AI to apply an image filter to the target scene.

15. A system for generating personalized image content comprising one or more computers and one or more storage devices storing instructions that are operable, when executed by the one or more computers, to cause the one or more computers to:

receive, at a computing device, a first image of a target scene captured by a camera at a first time;

receive, at the computing device, a first bio-signal data stream for a first user collected at or around the first time;

identify, at the computing device, a first mood associated with the first user based on the first bio-signal data;

create a first prompt based on both the first image and the first mood, the first prompt including a set of parameters, wherein a weight assigned to each parameter is modulated based on the identified first mood, wherein creating the first prompt comprises:

automatically collecting the first bio-signal data stream of a user, wherein the first bio-signal data stream serves as a proxy of the user expression, converting the first bio-signal data stream into numerical values, and applying the numerical values to weight one or more descriptive words associated with the target scene;

providing the first prompt based on determining an intensity of word from the one or more descriptive words associated with the target scene; and pass the first prompt through a generative artificial intelligence (AI) engine to generate a second image that includes aspects of the target scene that have been imbued with stylistic elements that represent the first mood.

16. The system of claim 15, wherein the first bio-signal data stream is collected via a BCI device worn by the first user.

17. The system of claim 15, wherein the instructions further cause the one or more computers to pass the first bio-signal data stream through an emotion recognition classifier.

18. The system of claim 15, wherein the set of parameters includes time of day, temperature, and weather.

19. The system of claim 15, wherein the set of parameters includes geolocation, date, and point of interest.

20. The system of claim 15, wherein modulation of the weight assigned to each parameter in the first prompt causes the generative AI to adjust values of one or more of a hue, saturation, and lightness associated with the target scene.

* * * * *